United States Patent
Booher, Sr.

(10) Patent No.: US 12,264,716 B2
(45) Date of Patent: Apr. 1, 2025

(54) FRICTION ELEMENT CAPTURING AND POSITIONING ASSEMBLY AND METHODS OF MANUFACTURING THEREOF

(71) Applicant: AscenZ Friction & Brake LLC, Scottsdale, AZ (US)

(72) Inventor: Benjamin V. Booher, Sr., Scottsdale, AZ (US)

(73) Assignee: AscenZ Friction & Brake LLC, Scottsdale, AZ (US)

( * ) Notice: Subject to any disclaimer, the term of this patent is extended or adjusted under 35 U.S.C. 154(b) by 0 days.

(21) Appl. No.: 18/238,140

(22) Filed: Aug. 25, 2023

(65) Prior Publication Data
US 2024/0068534 A1    Feb. 29, 2024

Related U.S. Application Data

(60) Provisional application No. 63/521,172, filed on Jun. 15, 2023, provisional application No. 63/494,709, filed on Apr. 6, 2023, provisional application No. 63/436,055, filed on Dec. 29, 2022, provisional application No. 63/402,600, filed on Aug. 31, 2022.

(51) Int. Cl.
F16D 65/092        (2006.01)

(52) U.S. Cl.
CPC .................. *F16D 65/092* (2013.01)

(58) Field of Classification Search
CPC ............... F16D 65/092; F16D 65/0006; F16D 65/0971; F16D 65/095; F16D 65/02; F16D 2065/785
See application file for complete search history.

(56) References Cited

U.S. PATENT DOCUMENTS

| | | | |
|---|---|---|---|
| 8,752,679 B2 | 6/2014 | Arbesman et al. | |
| 9,140,322 B2 * | 9/2015 | Kobayashi | ............ F16D 65/095 |
| 2011/0198170 A1 * | 8/2011 | Turani | ................ C04B 38/0022 188/250 B |

FOREIGN PATENT DOCUMENTS

| | | | |
|---|---|---|---|
| FR | 3071573 | * | 3/2019 |
| GB | 2151729 | * | 7/1985 |

* cited by examiner

*Primary Examiner* — Pamela Rodriguez
(74) *Attorney, Agent, or Firm* — Kenneth C. Booth; Booth Udall Fuller, PLC

(57) ABSTRACT

A friction element capturing and positioning assembly that includes a positioning frame with a base portion having a periphery and defining a plurality of frame friction surfaces defining at least one capturing slot. At least one friction puck is received by the at least one capturing slot and fixed to the positioning frame at the frame friction surfaces.

29 Claims, 29 Drawing Sheets

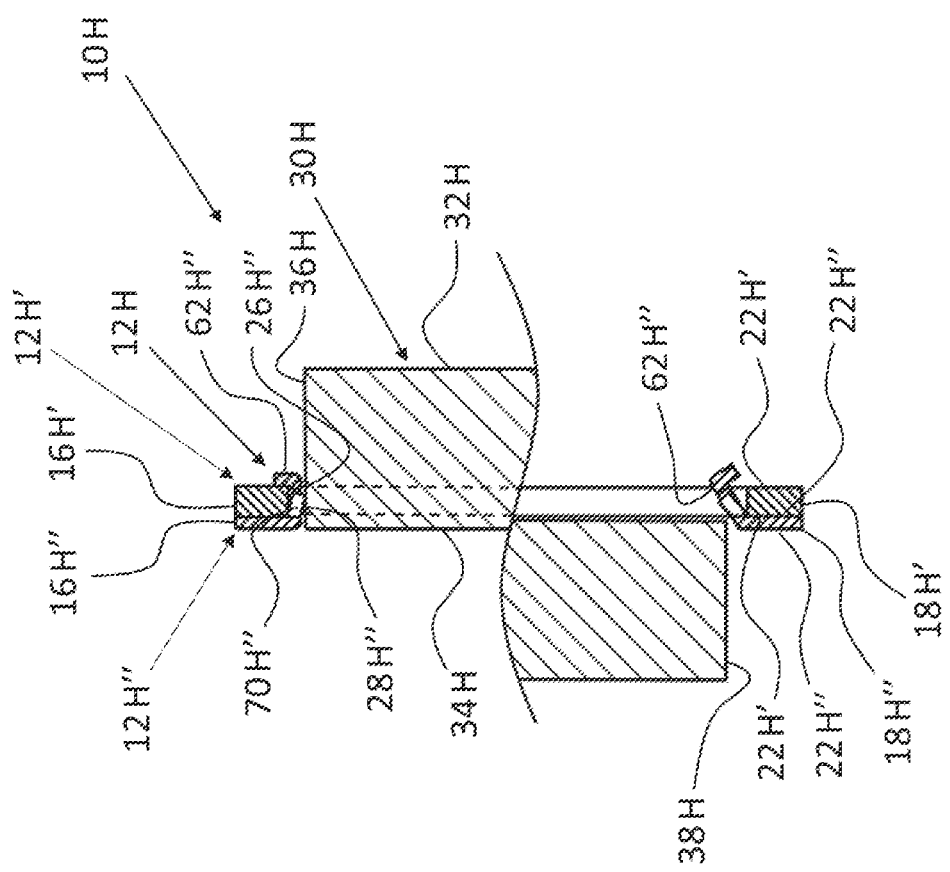

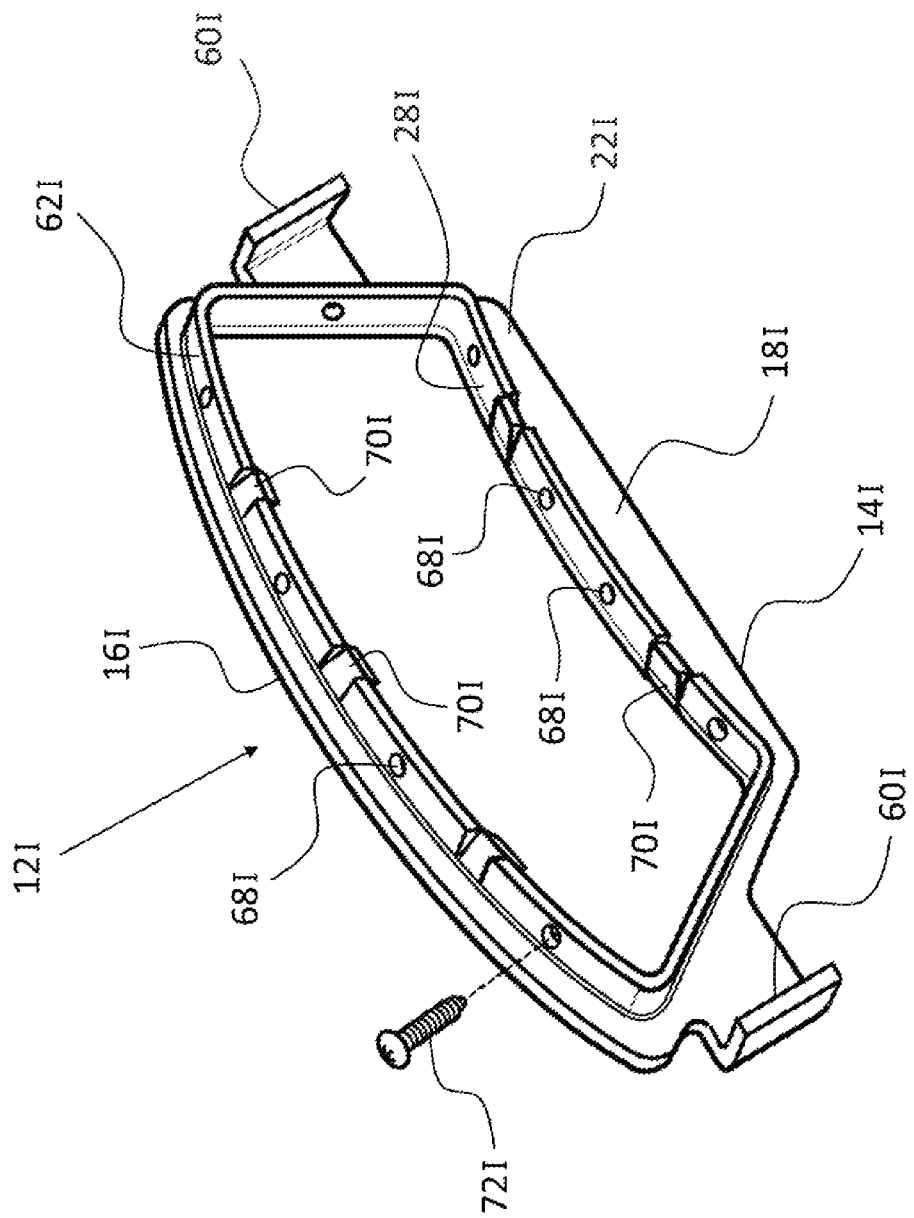

FRICTION ELEMENT CAPTURING AND POSITIONING ASSEMBLY AND METHODS OF MANUFACTURING THEREOF

CROSS-REFERENCE TO RELATED APPLICATIONS

This application claims the benefit of U.S. Provisional Patent Application Ser. No. 63/402,600, filed on Aug. 31, 2022, U.S. Provisional Patent Application Ser. No. 63/436,055, filed on Dec. 29, 2022, U.S. Provisional Patent Application Ser. No. 63/494,709, filed on Apr. 6, 2023, and U.S. Provisional Patent Application Ser. No. 63/521,172, filed on Jun. 15, 2023, the entire disclosures of which are hereby incorporated by reference in their entireties.

FIELD OF THE INVENTION

The present disclosure relates to friction braking, such as a brake assembly for an automobile.

BACKGROUND

Brake assemblies, like automotive friction brake assemblies conventionally consist of a pair of friction members, one rotating and one stationary, brought into engagement to produce a friction force measured as braking torque for either slowing or stopping the rotating member. In the case of automobiles, this causes the vehicle to which the friction brake is adapted to slow down. Ordinarily, the stationary member, commonly referred to as the brake pad, is forced against the rotating member, commonly referred to as the rotor. Conventional brake pads consist of friction elements, referred to as pucks, which are joined to back plates by any of bonding, riveting, and/or integral molding means. These joining methods add significantly to the cost, processing steps, and time required to assemble a brake pad.

A traditional friction clutch is similar, in some respects, to a friction brake and typically consists of a grouping of friction elements positioned to selectively couple a rotating driving element to bring the non-driven element up to speed with the driving element. Such a clutch assembly commonly consists of a circular friction plate or disc having friction pads or elements of friction material on both faces squeezed between a pair of metal pressure plates. Much as in the case of automotive friction brakes, existing clutch elements consist of friction portions that are joined to backings by methods such as bonding, riveting, and integral molding. Again, conventional joining methods add significantly to the cost, processing steps, and time required to assemble a clutch pad. Accordingly, there remains a need for improvements to friction brakes.

SUMMARY OF THE INVENTION

According to an aspect of the disclosure, a friction element capturing and positioning assembly includes a positioning frame with a base portion having a periphery and defining a plurality of frame friction surfaces defining at least one capturing slot. At least one friction puck is received by the at least one capturing slot and is fixed to the positioning frame at the frame friction surfaces.

The connection of the friction puck to the positioning frame via the capturing slot and frame friction surfaces provides a simple and low cost manner of connecting the friction puck to the positioning frame which eliminates the need for heavier and more costly back plates, complicated secondary processing used to produce texture upon the back plate surface as required for integral molding, and eliminates the need for bonding, riveting, or other methods of affixing the friction element to a back plate.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 8B are side, cross-sectional views of the seventh embodiment of a friction capturing and positioning assembly;

FIG. 9 is a perspective view of another embodiment of a positioning frame of a friction capturing and positioning assembly;

DESCRIPTION OF THE ENABLING EMBODIMENT

Figure 1A:
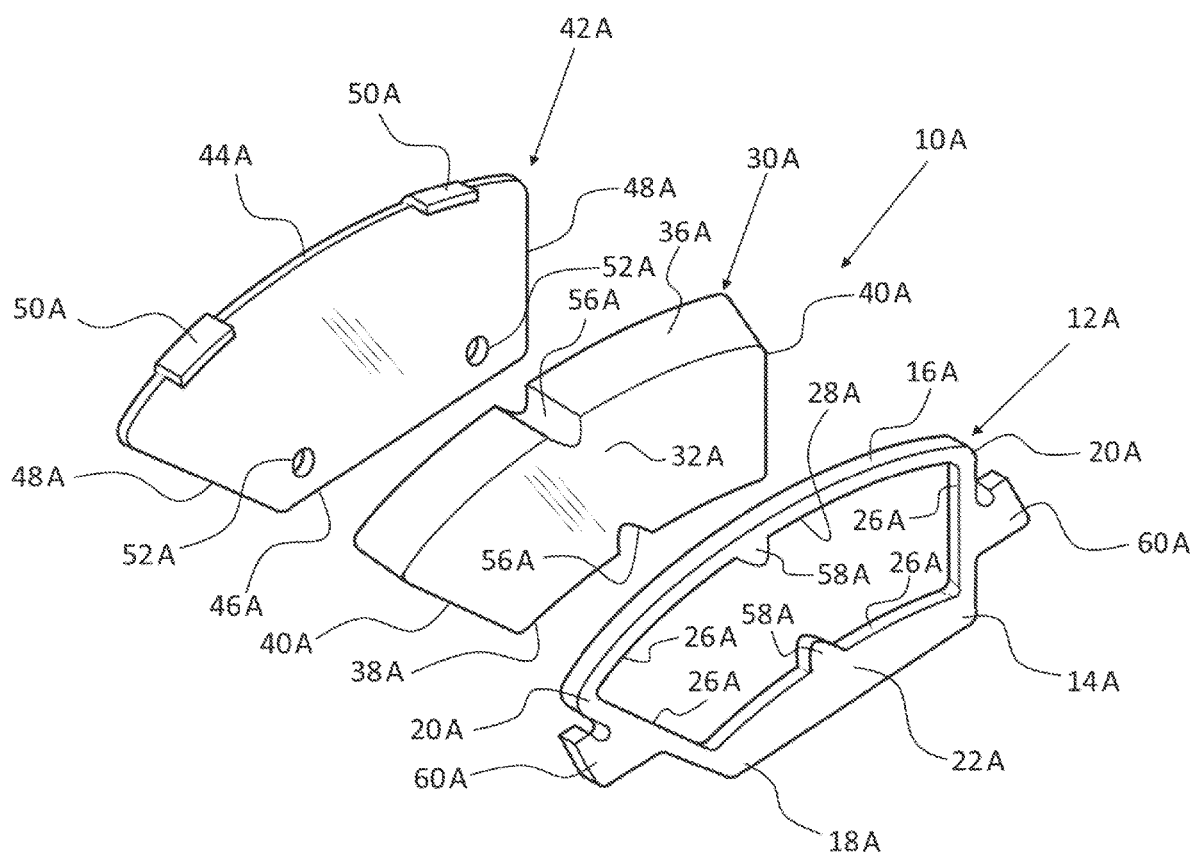
FIG. 1A is perspective, exploded view of a first embodiment of a friction capturing and positioning assembly.

The present disclosure relates to a friction element capturing and positioning assembly including components, materials, and manufacturing methods thereof. In particular, the present disclosure includes explanations of friction element capturing and positioning assemblies for brakes, clutches, and the like, and pertains particularly to improved mechanisms and structures for brake and clutch friction pad assemblies, compositions, and methods for making the same.

The methods and structures disclosed herein relate more specifically to a friction element capturing and positioning assembly that eliminates the need for heavier and more costly back plates, and eliminates the complicated secondary processing used to produce texture upon the back plate surface as required for integral molding, and eliminates the need for bonding, riveting, or other methods of affixing the friction element to a back plate. A variety of implementations to illustrate the invention are illustrated, each with its own set of advantages. It should be understood that the components depicted and discussed are non-limiting examples, and that the contemplated and described components may be combined with any of the other components in other implementations.

As an overview, however, embodiments herein each include at least one friction puck that includes a front surface, a back surface and side surfaces, with the side surfaces in some implementations being tapered at any suitable degree of angularity, for example and without limitation, from the back surface toward the front surface, so that the front surface includes a surface area smaller than the back surface. Each of the embodiments also include a positioning frame that has at least one frame friction surface which defines a capturing slot for receiving and securing a friction puck to the positioning frame. Side surfaces of the capturing slot between a rear surface and a front edge of the positioning frame may also be tapered so that the capturing slot near the rear surface is larger than the opening near the front edge. In other implementations, the side surfaces of the friction pucks and/or positioning frame may be vertical in relation to the friction puck face. The methods and structures disclosed herein relate more specifically to a friction element capturing and positioning assembly that eliminates the need for heavier and more costly back plates, and eliminates the complicated secondary processing used to produce texture upon the back plate surface as required for integral molding, and eliminates the need for bonding, riveting, or other methods of affixing the friction element to a back plate. A variety of implementations to illustrate the invention are illustrated, each with its own set of advantages. It should be understood that the components depicted and discussed are non-limiting examples, and that the contemplated and described components may be combined with any of the other components in other implementations.

Example embodiments of a friction element capturing and positioning assembly embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms and that neither should be construed to limit the scope of the disclosure. Features of the embodiments may be combined with one another. In some example embodiments, well-known processes, well-known device structures, and well-known technologies are not described in detail.

Referring to the figures, wherein like numerals indicate corresponding parts throughout the several views embodiments of a friction element capturing and positioning assembly 10A-10S are provided. It should be appreciated that features with the same base reference numeral but different alphabetical identifiers, e.g., 10A versus 10B, are intended to be different embodiments of the same feature.

Figure 1B:
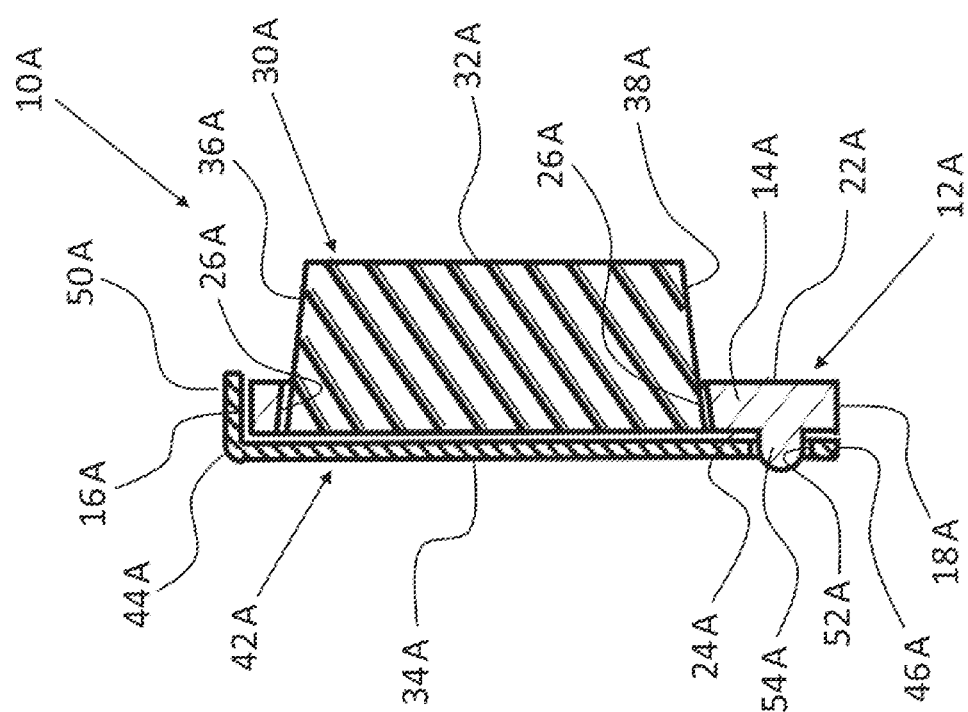
FIG. 1B is a side, cross-sectional view of the first embodiment of the friction capturing and positioning assembly.

With reference to FIGS. 1A-1B, according to a first embodiment of the friction element capturing and positioning assembly 10A, the assembly 10A includes a positioning frame 12A. The positioning frame 12A has a base portion 14A with a periphery which is comprised of a top segment 16A, a bottom segment 18A opposite the top segment 16A and a pair of side segments 20A that extend between the top and bottom segments 16A, 18A. The base portion 14A also has a front surface 22A and a rear surface 24A opposite the front surface 22A. The base portion 14A defines a plurality of frame friction surfaces 26A that define at least one capturing slot 28A. In the case of the first embodiment, the at least one capturing slot 28A extends through the base portion 14A of the positioning frame 12A in the form of a four-sided channel such that the capturing slot 28A is defined by four sides.

The positioning frame 12A may consist of any suitable material or combination thereof, including but not limited to composites and metals, with any suitable finish on any or all surfaces. The positioning frame 12A may be produced by any suitable manufacturing method, including not limited to die punching, automated or hand layup, pultrusion, extrusion, and/or any combination thereof. According to this and the other embodiments described herein, the positioning frame 12A has a generally trapezoidal shape, but could have other shapes depending on specific uses.

A friction puck 30A is received by, and fitted within the confines of the capturing slot 28A. The friction puck 30A has a front face 32A and a rear face 34A opposite the front face 32A. The friction puck 30A also has a top face 36A, a bottom face 38A opposite the top face 36A, and a pair of side faces 40A extending between the top and bottom faces 36A, 38A. While the friction puck 30A is positioned in the capturing slot 28A, the top, bottom and side faces 36A, 38A, 40A of the friction puck 30A all engage the positioning frame 12A such that frame friction surfaces 26A are defined about an entire perimeter of the entire capturing slot 28A. The friction puck 30A may consist of any suitable material, including without limitation, composites consisting of any number of layers and variations of materials, and resin-bonded metallic friction materials manufactured by any suitable method, including but not limited to pultrusion and captive molding. As will be discussed in further detail below, the friction puck 30A of this and the other embodiments described herein may be made with the materials and methods described in U.S. Pat. No. 11,007,684 to the Applicant and titled "Composite friction elements and pultrusion method of making same," incorporated by reference herein in its entirety. As shown, the friction pick 30A of this and the other embodiments described herein has a generally trapezoidal shape similar to that of the positioning frame 12A, but could have any suitable geometric shape based on specific needs.

As best shown in FIG. 1B, the base portion 14A of the positioning frame 12A tapers inwardly along the capturing slot 28A as it extends between the rear and front surfaces 24A, 22A of the base portion 14A. Likewise, the top, bottom and side faces 36A, 38A, 40A of the friction puck 30A all taper inwardly along a length between the rear and front faces 34A, 32A at at least substantially the same angle as the positioning frame 12A such that the friction puck 30A can be wedged into place in the capturing slot 28A of the positioning frame 12A with the surfaces of the frame friction surfaces 26A lying at least substantially flush over the faces 36A, 38A, 40A of the friction puck 30A. The tapered faces of the positioning frame 12A and friction puck 30A may include any suitable geometry, including any suitable surface characteristics, including but not limited to smooth, rough, and/or jagged.

The rear surface 24A of the positioning frame 12A and the rear face 34A of the friction puck 30A both overlie and engage a shim plate 42A. The shim plate 42A has a planar face and generally has the same trapezoidal shape as the positioning frame 12A and friction puck 30A. It should be appreciated that the shim plate 42A of this and the other embodiments could have other shapes depending on specific applications. The shim plate 42A has a top edge 44A, a bottom edge 46A opposite the top edge 44A, and a pair of side edges 48A extending between the top and bottom edges 44A, 46A on opposing sides of the shim plate 42A relative to one another. The shim plate 42A of this and the other embodiments may consist of any suitable material or combination thereof, including but not limited to composites and metals, with any suitable surface finish.

A pair of clips 50A extend from the top edge 44A of the shim plate 42A, generally perpendicularly to the face of the shim plate 42A. The clips 50A overlie the positioning frame 12A to align the shim plate 42A relative to the positioning frame 12A.

The shim plate 42A defines two passages 52A adjacent to the bottom edge 46A of the shim plate 42A. Two punch studs 54A extend from the positioning frame 12A and are each received by one of the passages 52A of the shim plate 42A for aligning and connecting the positioning frame 12A to the shim plate 42A. Any number of passages 52A and associated punch studs 54A could be used depending on specific applications. The shim plate 42A may be fitted to the positioning frame 12A by any suitable attachment or combination thereof, including but not limited to the clips, punch studs/through passages, and/or other suitable attachment, for example and without limitation, adhesion, riveting and welding.

The top face 36A and the bottom face 38A of the friction puck 30A each define an alignment recess 56A. Furthermore, an alignment finger 58A extends from the top segment 16A of the positioning frame 12A into the capturing slot 28A, and an alignment finger 58A extends from the bottom segment 18A of the positioning frame 12A into the capturing slot 28A, with each of the alignment fingers 58A received by one of the alignment recesses 56A of the friction puck 30A for aligning the friction puck 30A relative to the positioning frame 12A. Any number of alignment recesses 56A and associate alignment fingers 58A may be employed as needed. The positioning frame 12A may include and/or provide for any suitable means of jointment to other components like the friction puck 30A. The alignment recesses 56A and alignment fingers 58A may exist in any suitable angular orientation, geometric shape, and number. Furthermore, while alignment fingers 58A may not be tapered, frame friction surfaces 26A, and the top, bottom, and side surfaces of friction puck 30A may be tapered inward, or outward to any suitable degree to provide wedging of the friction puck 30A in the friction frame surfaces 26A. Additionally, the friction puck 30A may be fitted within the frame friction surfaces 26A via an interference fit.

A pair of location tabs 60A each extend from one of the side segments 20A of the positioning frame 12A for holding the brake pad assembly 10A in position within the confines of a brake caliper. The overall outer peripheral geometry of the positioning frame 12A may be adapted to existing brake assemblies.

Figure 2A:
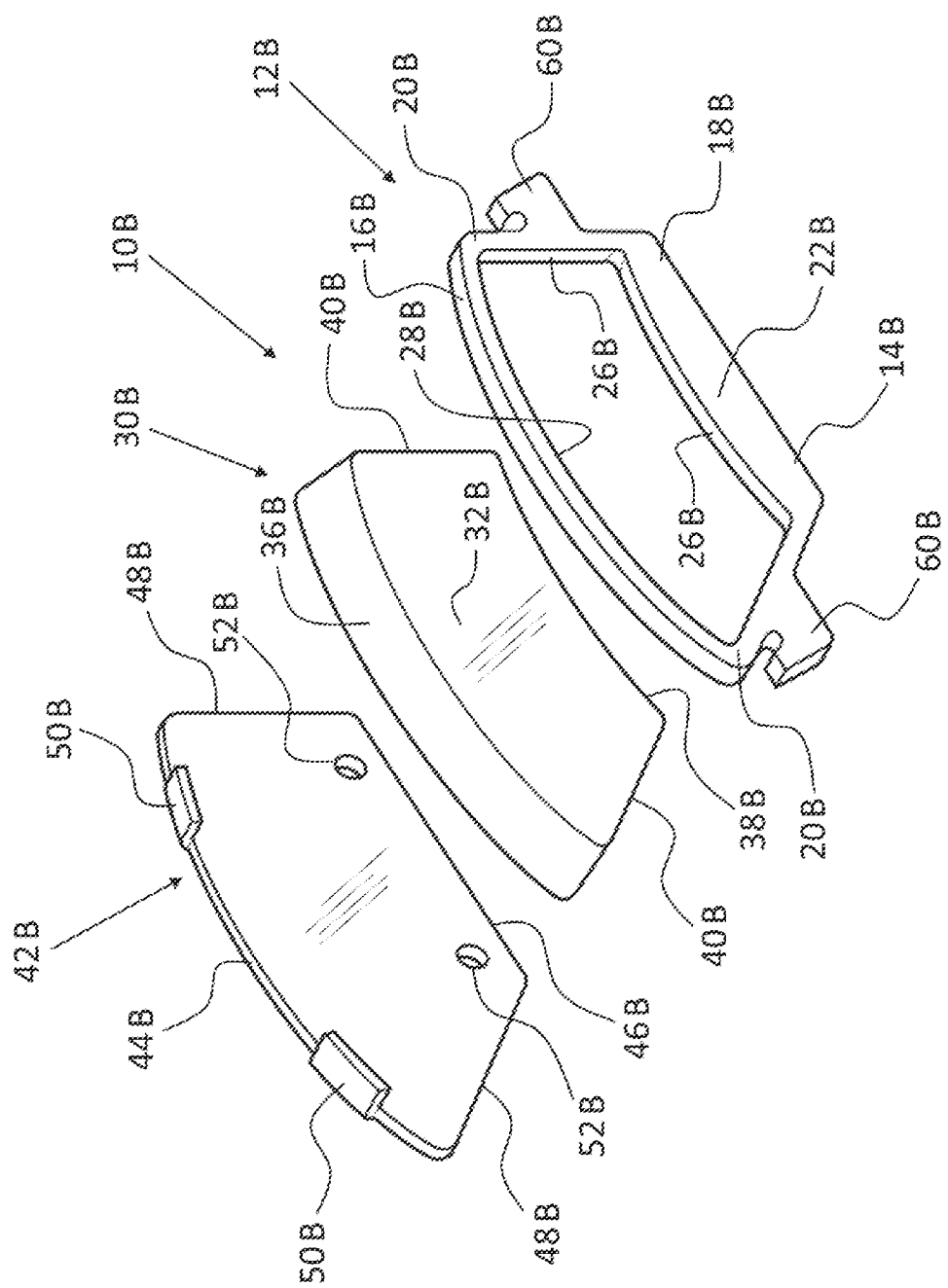
FIG. 2A is a perspective, exploded view of a second embodiment of a friction capturing and positioning assembly.
Figure 2B:
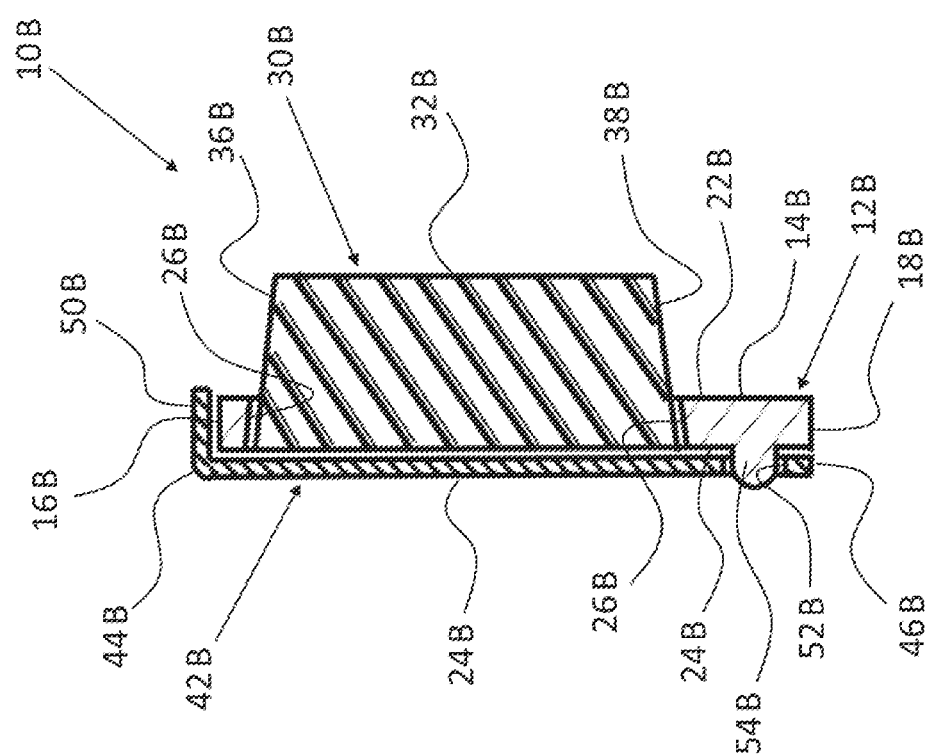
FIG. 2B is a side, cross-sectional view of the second embodiment of a friction capturing and positioning assembly.

With reference to FIGS. 2A-2B, a second embodiment of the friction element capturing and positioning assembly 10B is shown. This embodiment is similar to the first embodiment of the assembly 10A, but does not include an alignment recess and associated alignment finger. Nevertheless, the friction puck 30B may remain secured, wedged or otherwise positioned within the positioning frame 12B due to its arrangement of frame friction surfaces 26B. Furthermore, frame friction surfaces 26B and the top, bottom, and side surfaces of friction puck 30B may be tapered inward or outward to any suitable degree to provide wedging of the friction puck 30B in the friction frame surfaces 26B. Additionally, the friction puck 30B may be fitted within the frame friction surfaces 26B via an interference fit.

Figure 3A:
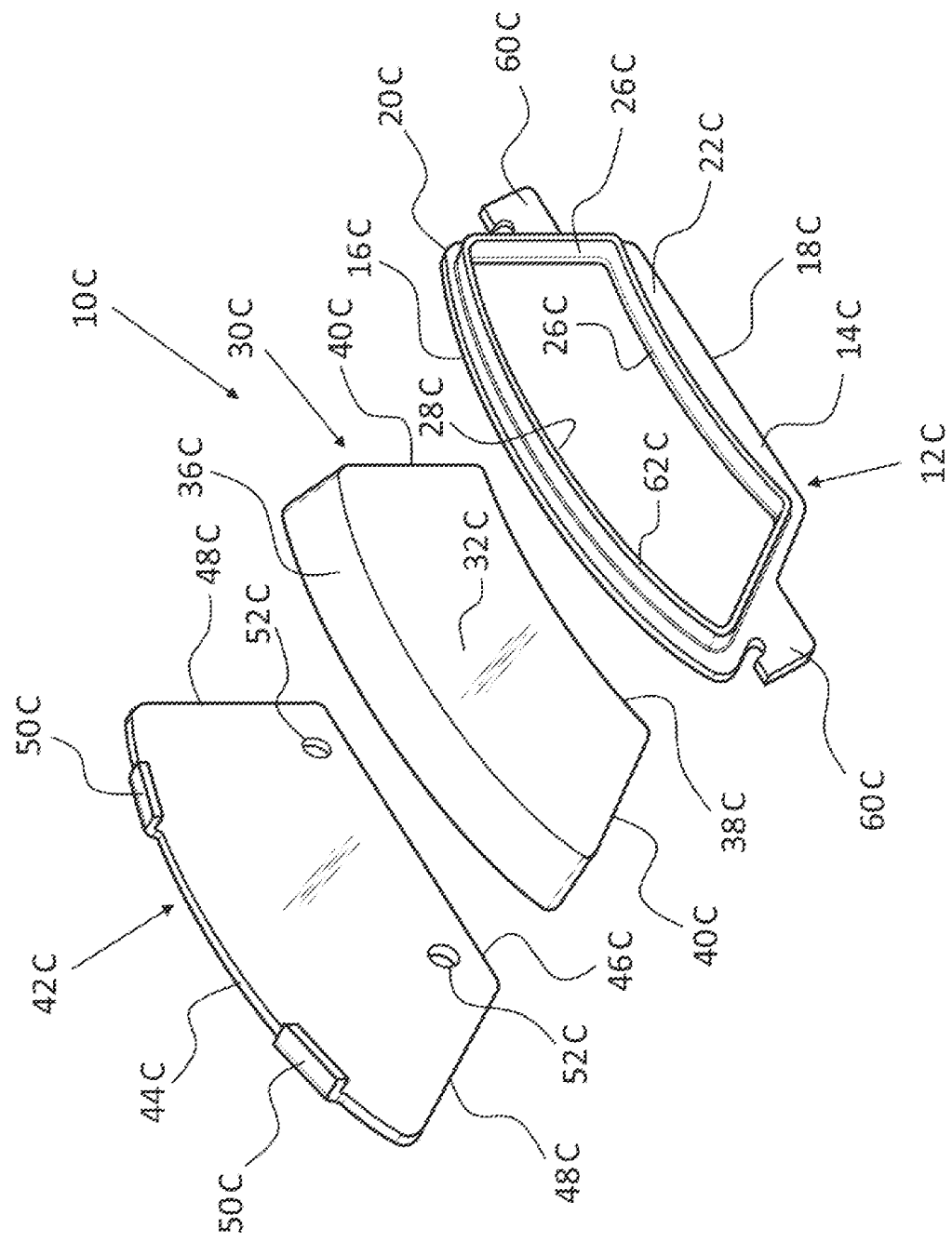
FIG. 3A is a perspective, exploded view of a third embodiment of a friction capturing and positioning assembly.
Figure 3B:
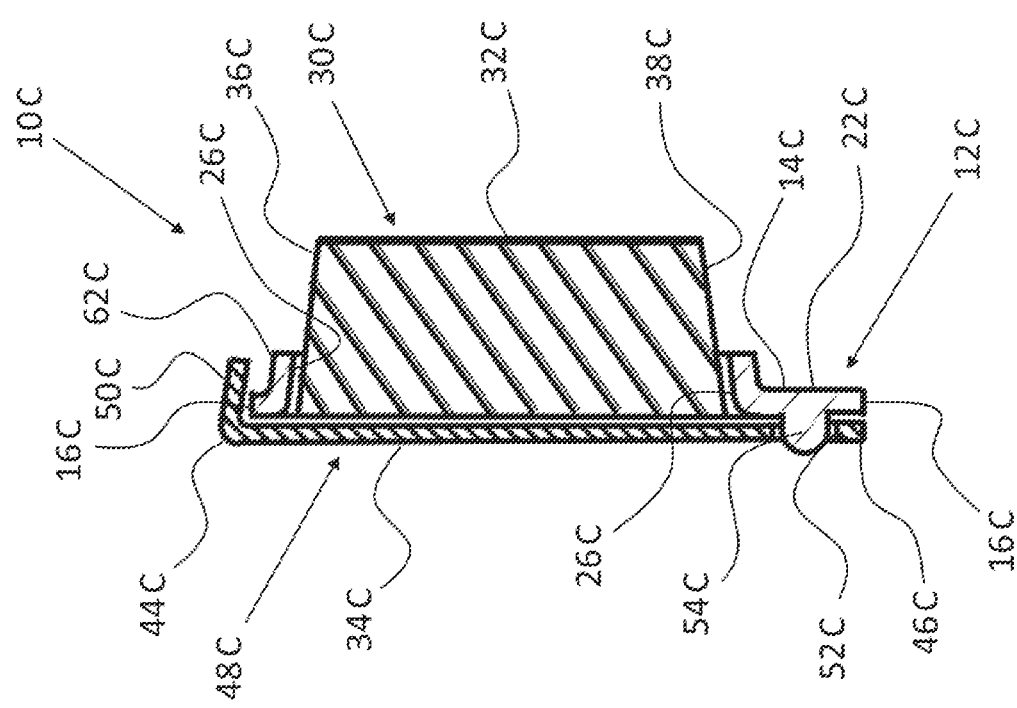
FIG. 3B is a side, cross-sectional view of the third embodiment of a friction capturing and positioning assembly.

With reference to FIGS. 3A-3B, a third embodiment of the friction element capturing and positioning assembly 10C is shown. This embodiment is similar to the first two embodiments, but of note, a frame tab 62C projects from the base portion 14C of the positioning frame 12C and extends about the capturing slot 28C in the form of a rim such that the frame tab 62C defines the frame friction surface 26C. As best shown in FIG. 3B, the frame tab 62C tapers inwardly as it extends away from the front surface 22C of the base portion 14C of the positioning frame 12C at at least substantially the same angle as the friction puck 30C such that the friction puck 30C can be wedged into the frame tab 62C. According to this embodiment, the base portion 14C of the positioning frame 12C is more narrow/thin than the previously described embodiments to reduce weight while still providing significant surface contact area of frame friction surfaces 26C on the friction puck 30C. Furthermore, frame friction surfaces 26C and the top, bottom, and side surfaces of friction puck 10C may be tapered inward or outward to any suitable degree to provide wedging of the friction puck 30C in the friction frame surfaces 26C. Additionally, the friction puck 30C may be fitted within the frame friction surfaces 26C via an interference fit.

Figure 4:
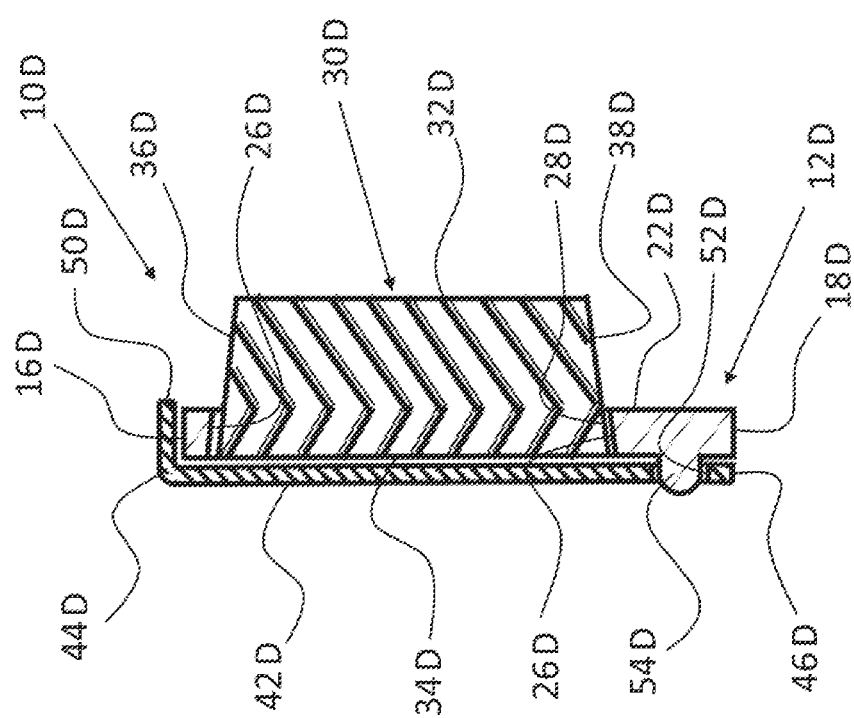
FIG. 4 is a side, cross-sectional view of a fourth embodiment of a friction capturing and positioning assembly.

With reference to FIG. 4, a fourth embodiment of the friction element capturing and positioning assembly 10D is shown. This embodiment is similar to the previously described embodiments, but of note, the friction puck 30D is formed of multiple regions of like or unlike materials produced by any suitable method, including without limitation, pultrusion, injection molding, compression molding, and/or any combination thereof. For example, U.S. Pat. No. 11,007,684 to the Applicant and titled "Composite friction elements and pultrusion method of making same," incorporated by reference herein in its entirety, discloses multiple layer friction composites for friction pucks that could be used with the embodiments discussed herein. When utilized, the friction puck 30D may consist of any suitable geometry, including any suitable surface characteristics, including but not limited to smooth, rough and/or jagged. The front face 32D of the friction puck 30D of this and other embodiments may exist in any suitable number and geometric shape. The friction puck 30D body may consist of any suitable material in any number of layers or regions and variations of materials, including without limitation, pultruded friction composite and resin-bonded metallic friction materials and the like in any combination thereof manufactured by any suitable method, including but not limited to pultrusion and captive molding.

Figure 5:
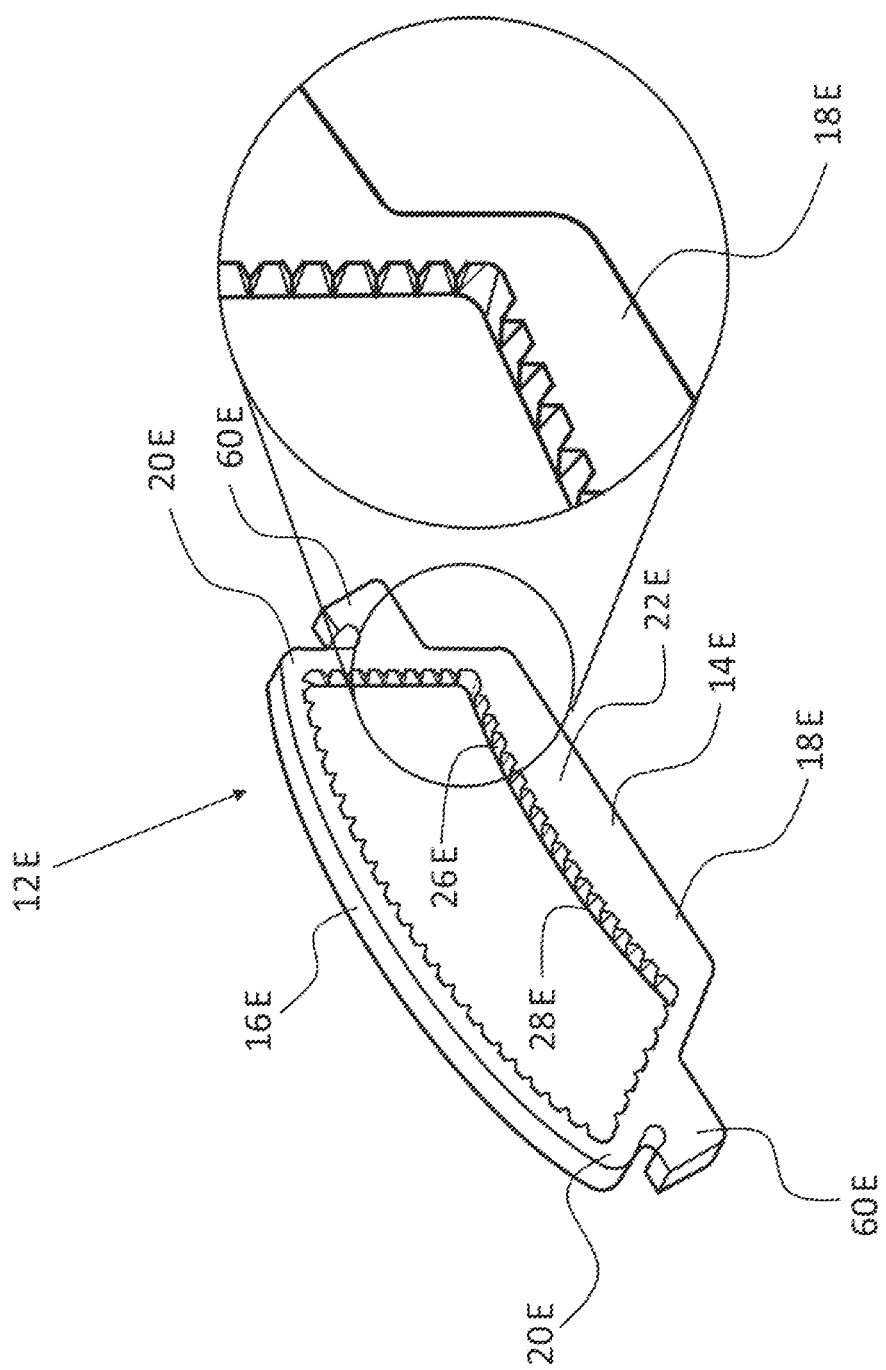
FIG. 5 is a perspective view of an additional embodiment of a positioning frame of the friction capturing and positioning assembly.

With reference to FIG. 5, an alternate arrangement of a positioning frame 12E is shown. According to this embodiment, the frame friction surface 26E includes texturing about the capturing slot 28E for frictionally engaging the friction puck 30E upon insertion of the friction puck 30E into the capturing slot 28E. The texturing may consist of any suitable geometry, including any suitable surface characteristics, including but not limited to smooth, rough, and/or jagged. By including texturing on the frame friction surface 26E, and particularly by including a texturing that would "bite" into the friction puck if the puck is force fit into the capturing slot 28E of the positioning frame 12E, the mechanical engagement of the positioning frame 12E and the friction puck 30E will further enhance the relationship between the two without conventional methods of attaching a friction puck 30E to a backing plate. In this and other embodiments, if the friction puck 30E is slightly oversized in relation to the capturing slot 28E, so that some force is required to fit the friction puck 30E into the positioning frame 12E, the positioning frame 12E is sufficient to hold the friction puck 30E in place when the positioning frame 12E is used, despite the forces applied to it. The arrangement of the positioning frame 12E further restricts linear and rotational movement of the friction puck 30E, particularly when normal braking and other forces are used to compress the friction element capturing and positioning assembly 10E against rotors or other directionally engaging components. Furthermore, frame friction surfaces 26E may be tapered inward or outward to any suitable degree to provide wedging of the friction puck 30E in the friction frame surfaces 26E. Additionally, the friction puck 30E may be fitted within the frame friction surfaces 26E via an interference fit.

Figure 6A:
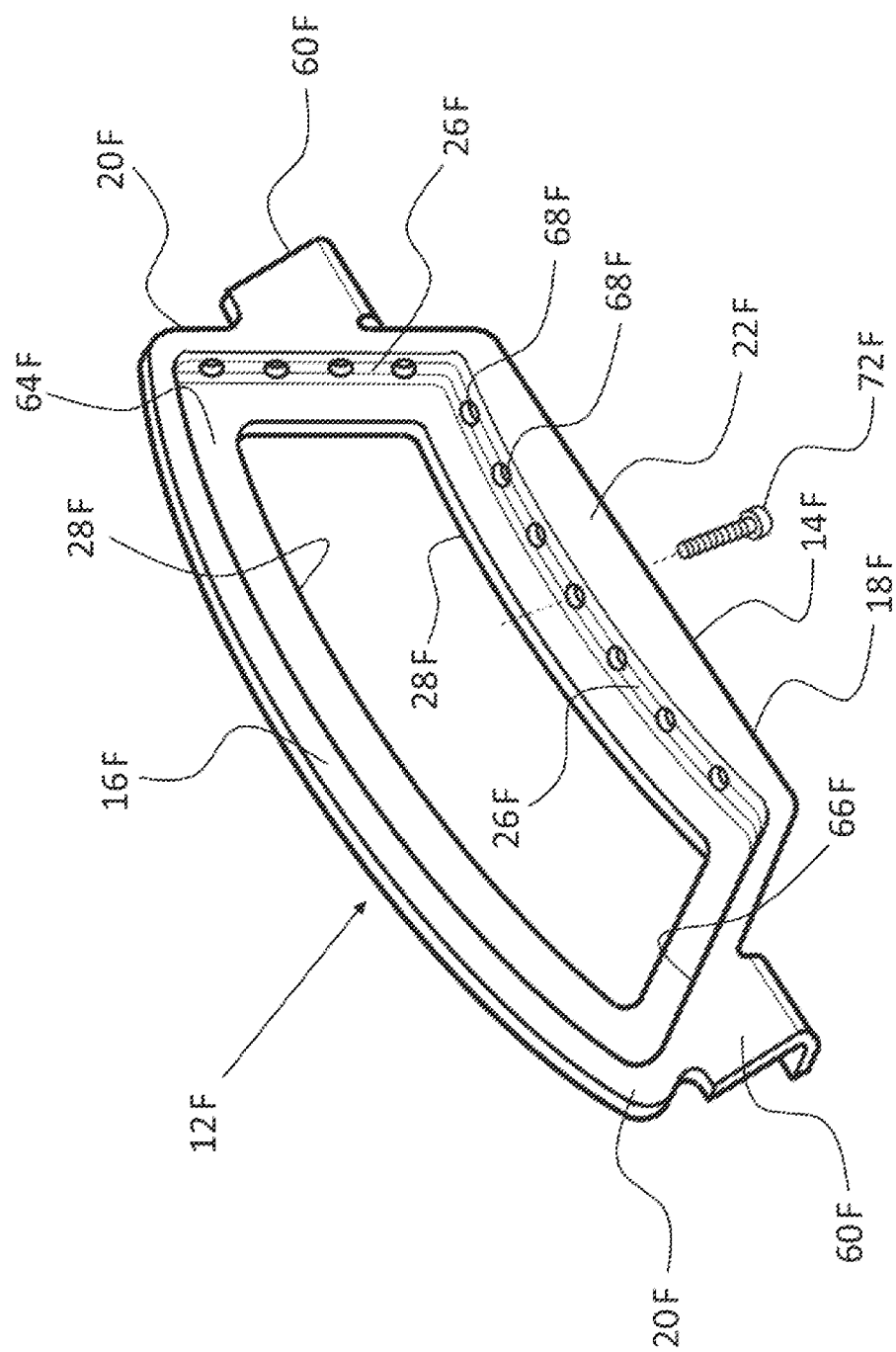
FIG. 6A is a perspective view of a positioning frame of a fifth embodiment of a friction capturing and positioning assembly.
Figure 6B:
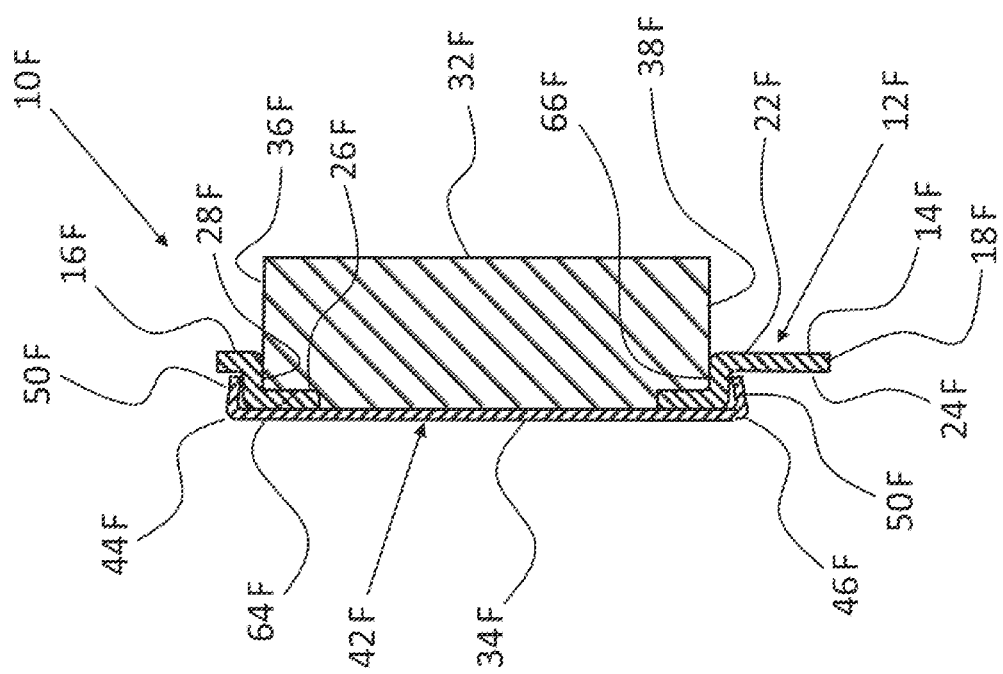
FIG. 6B is a side, cross-sectional view of the fifth embodiment of a friction capturing and positioning assembly.

With reference to FIGS. 6A-6B, a fifth embodiment of the friction element capturing and positioning assembly 10F is shown. According to this embodiment, the positioning frame 12F defines a recessed/cup portion 64F that is recessed relative to the base portion 14F. A sidewall 66F extends between the base portion 14F and the recessed portion 64F. The capturing slot 28F extends through the region of the recessed portion 64F, and as shown in FIG. 6B, while fitted in the capturing slot 28F, the friction puck 30F engages both the recessed portion 64F and the sidewall 66F to define frame friction surfaces 26F. Furthermore, the sidewall 66F may include a plurality of orifices 68F in spaced relationship with one another. The orifices 68F may provide a weight reduction effect and/or receive fasteners 72F (e.g., bolts, screws or press pins), and/or allow friction material to fill the voids and protrude outwardly to further tighten the friction puck 30F in place. The recessed portion 64F and/or sidewalls 66F may include texturing to enhance a vertical hold on the friction puck 30F and reduce the weight of the positioning frame 12F. According to this and other embodiments, the positioning frame 12F may consist of any suitable material or combination thereof, including but not limited to composites and metals, with any suitable finish on any or all surfaces, and may be produced by any suitable method, including, but not limited to 3D printing, die forming, automated or hand layup, compression molding, and/or any combination thereof. The recessed portion 64F may be positioned within a mold to receive a suitably formulated friction slurry that is then cured under heat and pressure to form the friction puck 30F which may consist of any suitable material, including without limitation, resin-bonded metallic friction materials manufactured by any suitable method. The capturing slot 28F may consist of voids created by any suitable method, including but not limited to die punching, and may exist in any suitable number and geometric shape including lettering and logos. The sidewall 66F may include any suitable geometric variation, including surface characteristics, such as but not limited to, smooth, rough, and/or jagged. A shim plate 42F may be provided and may consist of any suitable material or combination thereof, including but not limited to composites and metals, with any suitable finish and/or coating. It should be understood that implementations of the assembly 10F and the other embodiments may include any means for further enhancing the secure fit of the friction puck 30F within the frame portion, including but not limited to sizing tabs, crimping and pinning. Furthermore, the frame friction surfaces 26F may be perpendicular to the face of recessed portion 64F or tapered inward or outward to any suitable degree to provide wedging of the friction puck 30F in the friction frame surfaces 26F. Additionally, the friction puck 30F may be fitted within the frame friction surfaces 26F via an interference fit.

Figure 7:
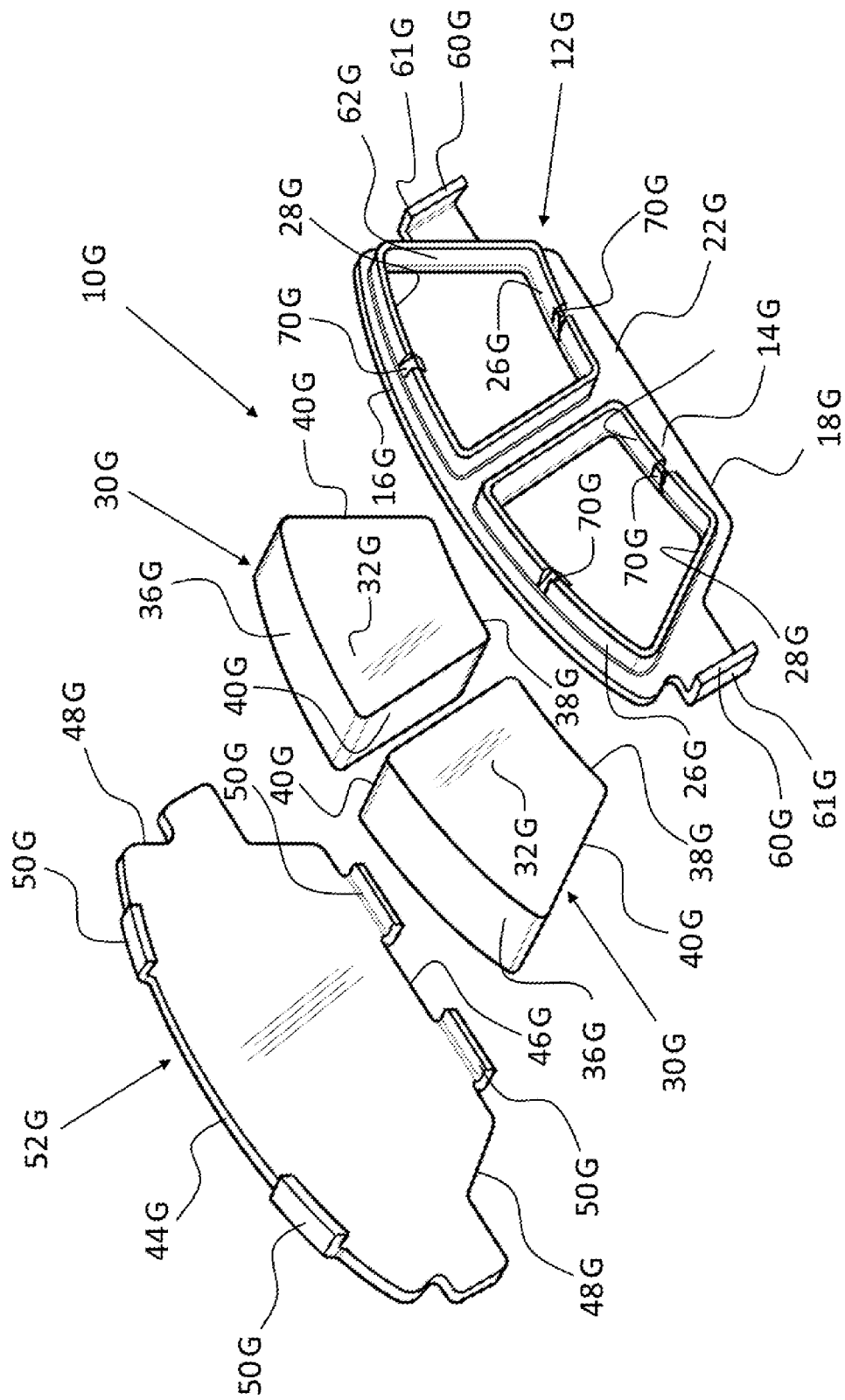
FIG. 7 is a perspective, exploded view of a sixth embodiment of a friction capturing and positioning assembly.

With reference to FIG. 7, a sixth embodiment of the friction element capturing and positioning assembly 10G is shown. According to this embodiment, the positioning frame 12G includes a pair of capturing slots 28G in spaced relationship with one another. Likewise, a pair of friction pucks 30G are each received by one of the capturing slots 28G. Any number of capturing slots 28G and friction pucks 30G in various geometric variations could be used based on specific needs, while the top, bottom and side faces of friction pucks 30G and frame friction surfaces 26G may be perpendicular to the face of positioning frame 12G or tapered inward or outward to any suitable degree to provide wedging of the friction puck 30G in the friction frame surfaces 26G. Additionally, the friction puck 30G may be fitted within the frame friction surfaces 26G via an interference fit. According to this embodiment, a frame tab 62G protrudes from the base portion 14G of the positioning frame 12G about each of the capturing slots 28G. Furthermore, a pair of fitment tabs 70G each extend from the base portion 14G angularly inwardly along each of the frame tabs 62G into the capturing slots 28G to engage the friction pucks 30G to accommodate minor friction puck 30G dimensional variations. Any number of fitment tabs 70G could be used depending on specific applications.

Additionally, a pair of clips 50G extend transversely from the top edge 44G of the shim plate 52G, and each overlie the positioning frame 12G, and another pair of clips 50G extend transversely from the bottom edge 46G of the shim plate 52G and each underlie the positioning frame 12G. Other numbers of clips 50G could be provided at various locations depending on specific needs.

Furthermore, each of the each of the location tabs 60G includes a bearing surface 61G that serves to reduce friction between the brake pad assembly 10G and sliding tracks of the brake caliper during brake actuation.

Figure 8A:
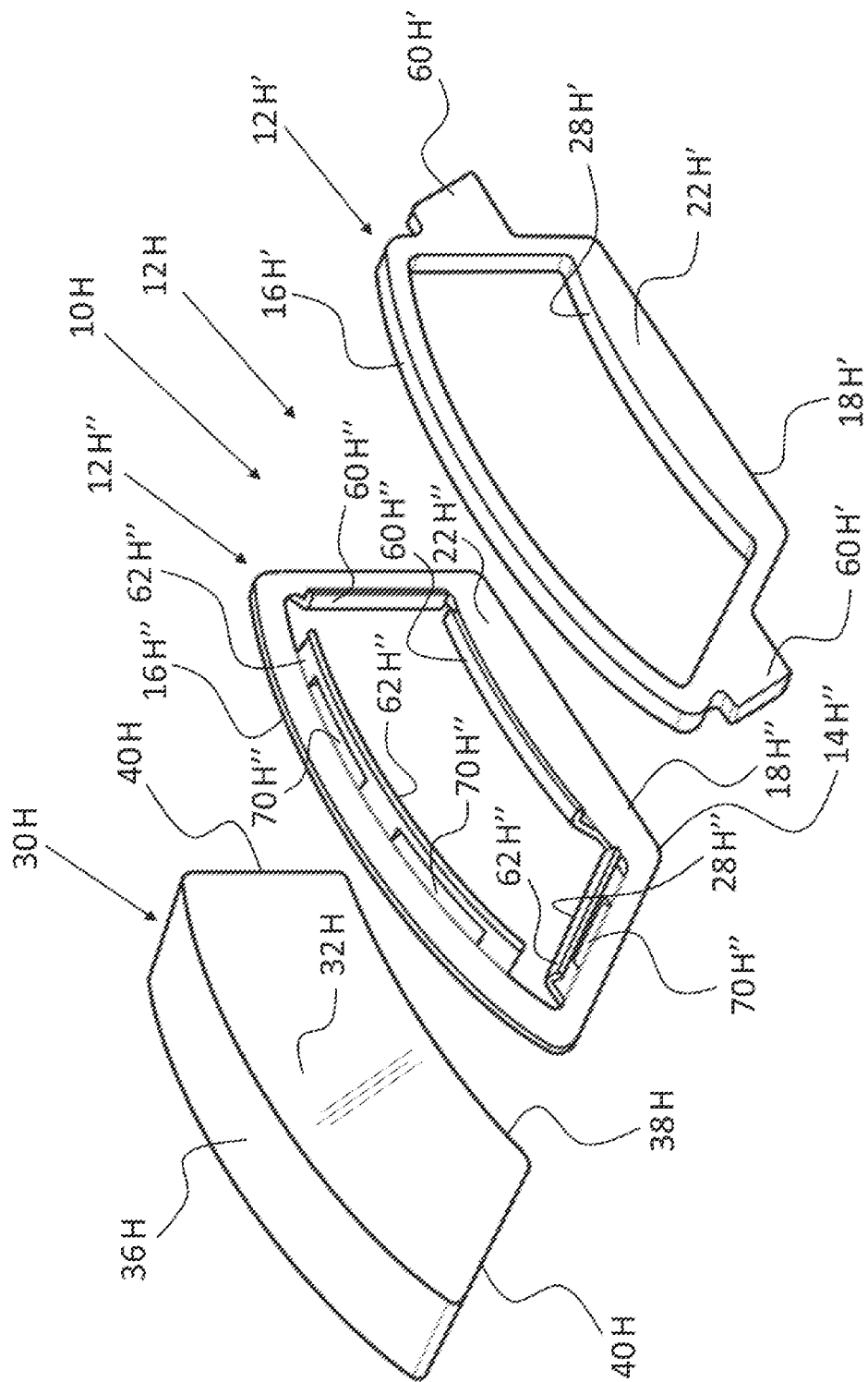
FIG. 8A is a perspective, exploded view of a seventh embodiment of a friction capturing and positioning assembly.

With reference to FIGS. 8A-8B, a seventh embodiment of the friction element capturing and positioning assembly 10H is shown. According to this and other embodiments, the positioning frame 12H is comprised of a base frame 12H' and a capturing insert 12H", with the base frame 12H' overlying the capturing insert 12H". The capturing insert 12H" may be made of any suitable materials, such as stainless steel and may be made with various methods such as extrusion and pultrusion methods. According to this arrangement, a first capturing slot 28H' is defined by the base frame 12H' and a second capturing slot 28H" is defined by the capturing insert 12H", with the first and second capturing slots 28H', 28H" overlying one another. Furthermore, a plurality of frame tabs 62H" extend from the capturing insert 12H", each received by the first capturing slot 28H' of the base frame 12H' and configured to engage the friction puck 30H. Furthermore, a plurality of fitment tabs 70H" each extend from the base portion 22H" angularly inwardly along the frame tabs 62H" into the capturing slots 28H" to engage the friction puck 30H to accommodate minor friction puck 30H dimensional variations. The frame tabs 62H" and fitment tabs 70H" are each biased toward the friction puck 30H for securing the friction puck 30H and positioning frame 12H components in place.

According to this and other embodiments, during assembly, the frame tabs 62H" of the capturing insert 12H" are fitted within the base frame's 12H' capturing slot 28H' before the friction puck 30H is pressed through the capturing slot 28H'. As the friction puck 30H engages the frame tabs 62H", they are spread more fully open. As illustrated in FIG. 8B, as the friction puck 30H is pressed fully into place, the frame tabs 62H" are forced into a fully open position which positions the frame tabs 62H" such that they capture the base frame 12H'. Furthermore, the top, bottom and side faces of friction puck 30H and faces of capturing slot 28H may be perpendicular to the face of positioning frame 12H or tapered inward or outward to any suitable degree to provide wedging of the friction puck 30H in the friction frame surfaces 26H. Additionally, the friction puck 30H may be fitted within the frame friction surfaces 26H via an interference fit.

This assembly 10H may also include a shim plate as previously described. Alternatively, it may be formed as shown without a shim plate.

Furthermore, while the fitment tabs 70H' are illustrated as central to the frame tabs 62H', the fitment tabs 70H' may act independently and be separate from the frame tabs 62H' (in this and other embodiments).

The positioning frame 12H components of this embodiment, as well as the other embodiments may be made from any suitable material or combination of materials, such as carbon fiber composite reinforced plastic which may demonstrate favorable heat isolating properties compared to alternate materials such as metals.

With reference to FIG. 9, a further embodiment of the positioning frame 12I is shown. According to this embodiment, a plurality of fitment tabs 70I each extend from the base portion 22I of the positioning frame 12I angularly inwardly along a continuous frame tab 62I into a capturing slot 28I to engage the friction puck 30I to accommodate minor friction puck 30I dimensional variations. Furthermore, the frame tab 62I may include a plurality of orifices 68I for providing a weight reduction and/or receiving tightening fasteners 72I (e.g., bolts, screws or press pins) for engaging the friction puck 30I to further provide a tightening effect. Frame tab 62I may be perpendicular to the face of positioning frame 12I or tapered inward or outward to any suitable degree to provide wedging of the friction puck 30I in the friction frame surfaces 26I. Additionally, the friction puck 30I may be fitted within the frame friction surfaces 26I via an interference fit. This arrangement can be stamped by a single stamping of any suitable material. On this and other embodiments, the frame tab 62I may be angled inwardly or outwardly. This arrangement is particularly light, simple and cost-effective.

Figure 10:
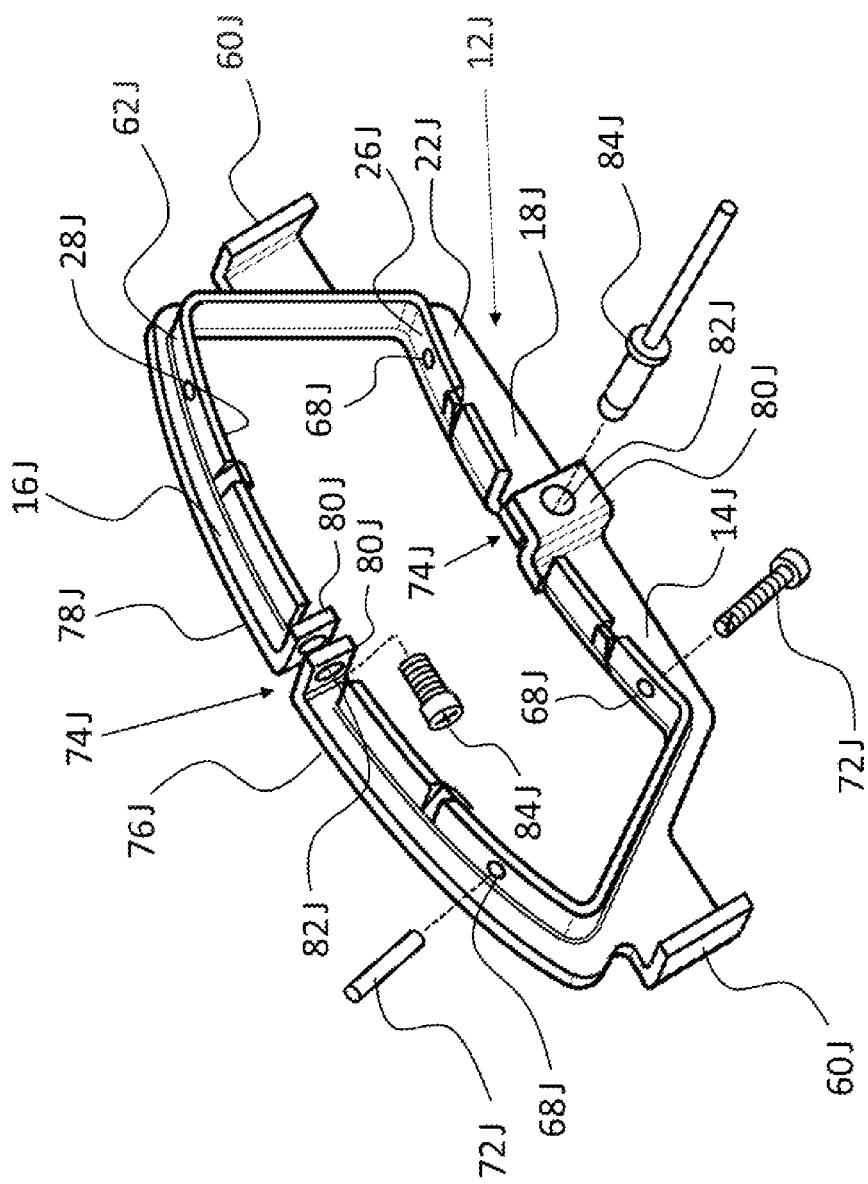
FIG. 10 is a perspective view of another embodiment of a positioning frame of a friction capturing and positioning assembly.

With reference to FIG. 10, a further embodiment of the positioning frame 12J is shown. According to this embodiment, the positioning frame 12J is broken into first and second segments 76J, 78J which are separated by two gaps 74J located along the top and bottom segments 16J, 18J of the positioning frame 12J. Each of the first and second segments 76J, 78J of the positioning frame 12J presents a pair of tightening flanges 80J, each at one of the gaps 74J adjacent to an opposing tightening flange 80J of the other segment 76J, 78J. The tightening flanges 80J each define a tightening orifice 82J for receiving a fastener 84J (e.g., a pin, screw, rivet, bolt, and/or other penetrating hardware) to tighten the first and second segments 76J, 78J toward one another to further capture the friction puck 30J in the capturing slot 28J. Any number of gaps 74J and associated tightening flanges 80J could be used. Furthermore, the tightening flanges 80J could be positioned in various orientations, including the sideways and front-back orientations shown in FIG. 10.

Figure 11A:
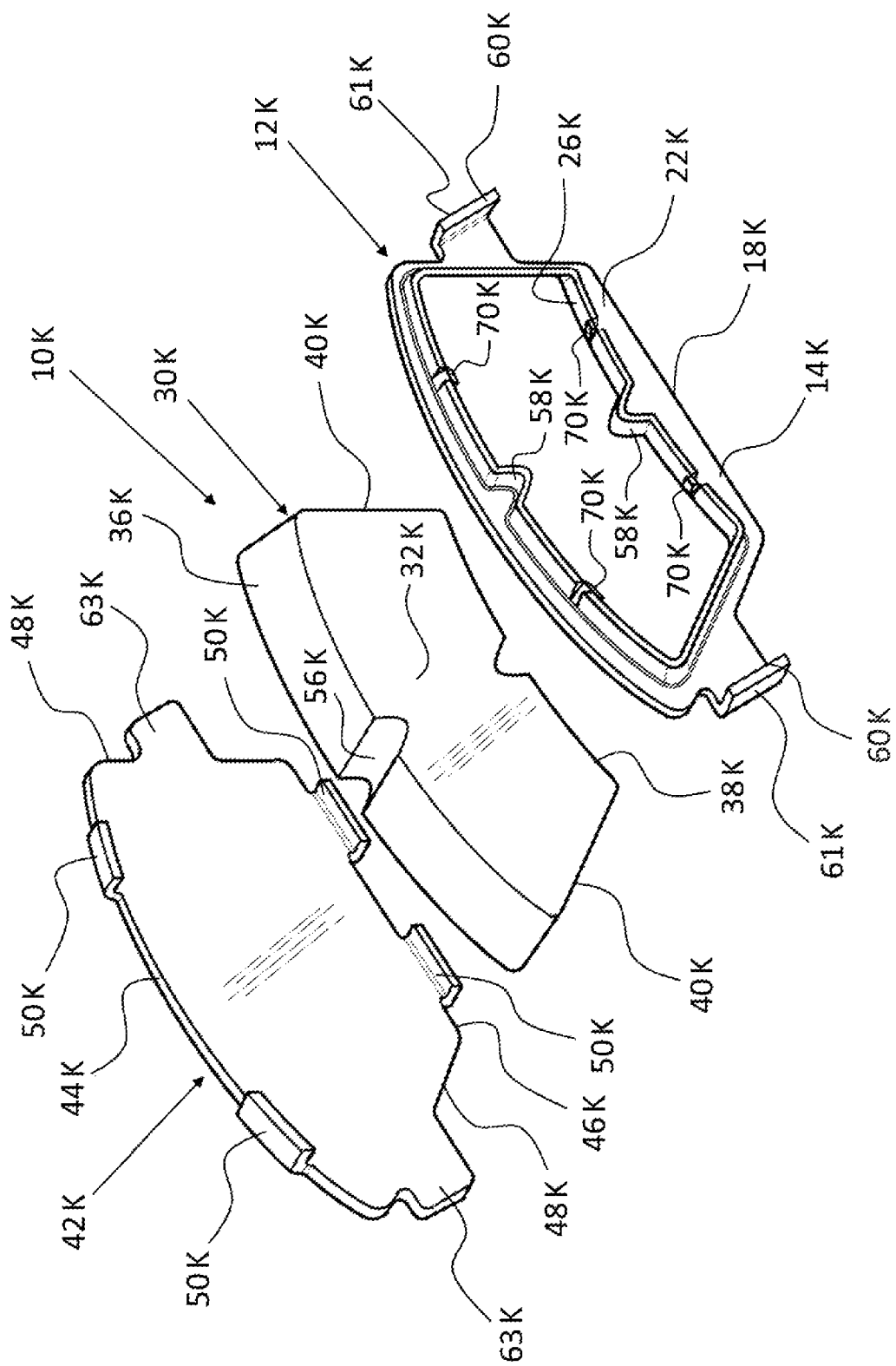
FIG. 11A is a perspective, exploded view an eighth embodiment of a friction capturing and positioning assembly.
Figure 11B:
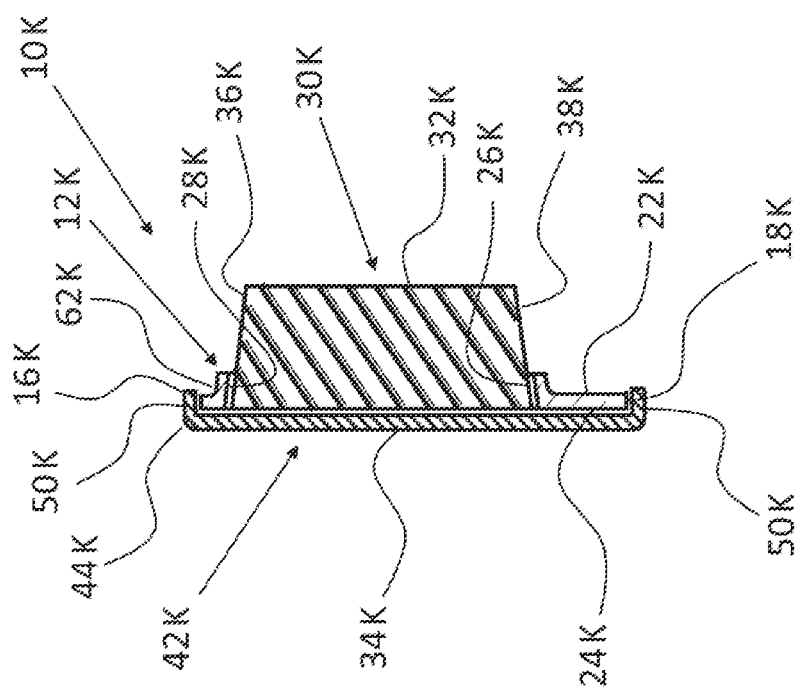
FIG. 11B is a side, cross-section view of the eighth embodiment of a friction capturing and positioning assembly.

With reference to FIGS. 11A-11B, an eighth embodiment of the friction element capturing and positioning assembly 10K is shown. This embodiment is similar to that of FIGS. 3A-3B, but of note includes an arrangement of alignment recesses 56K and alignment fingers 58K on the friction puck 30K and positioning frame 12K, similar to the first embodiment shown in FIGS. 1A-1B. This embodiment includes a pair of clips 50K that extend from a bottom edge 46K of the shim plate 42K. In addtion, a pair of location tabs 63K extend from the side edges 48K of the shim plate 42K for aligning the shim plate 42K and overall assembly 10K in a brake caliper. Furthermore, the location tabs 60K of the positioning frame 12K also define bearing surfaces 61K that serve to reduce friction between the brake pad assembly 10K and sliding tracks of the brake caliper during brake actuation. Additionally, while the faces of alignment fingers 58K may not be tapered, the frame friction surfaces 26K, and the top, bottom, and side surfaces of friction puck 10K may be tapered inward, or outward to any suitable degree to provide wedging of the friction puck 30K in the friction frame surfaces 26K. Additionally, the friction puck 30K may be fitted within the frame friction surfaces 26K via an interference fit.

Figure 12A:
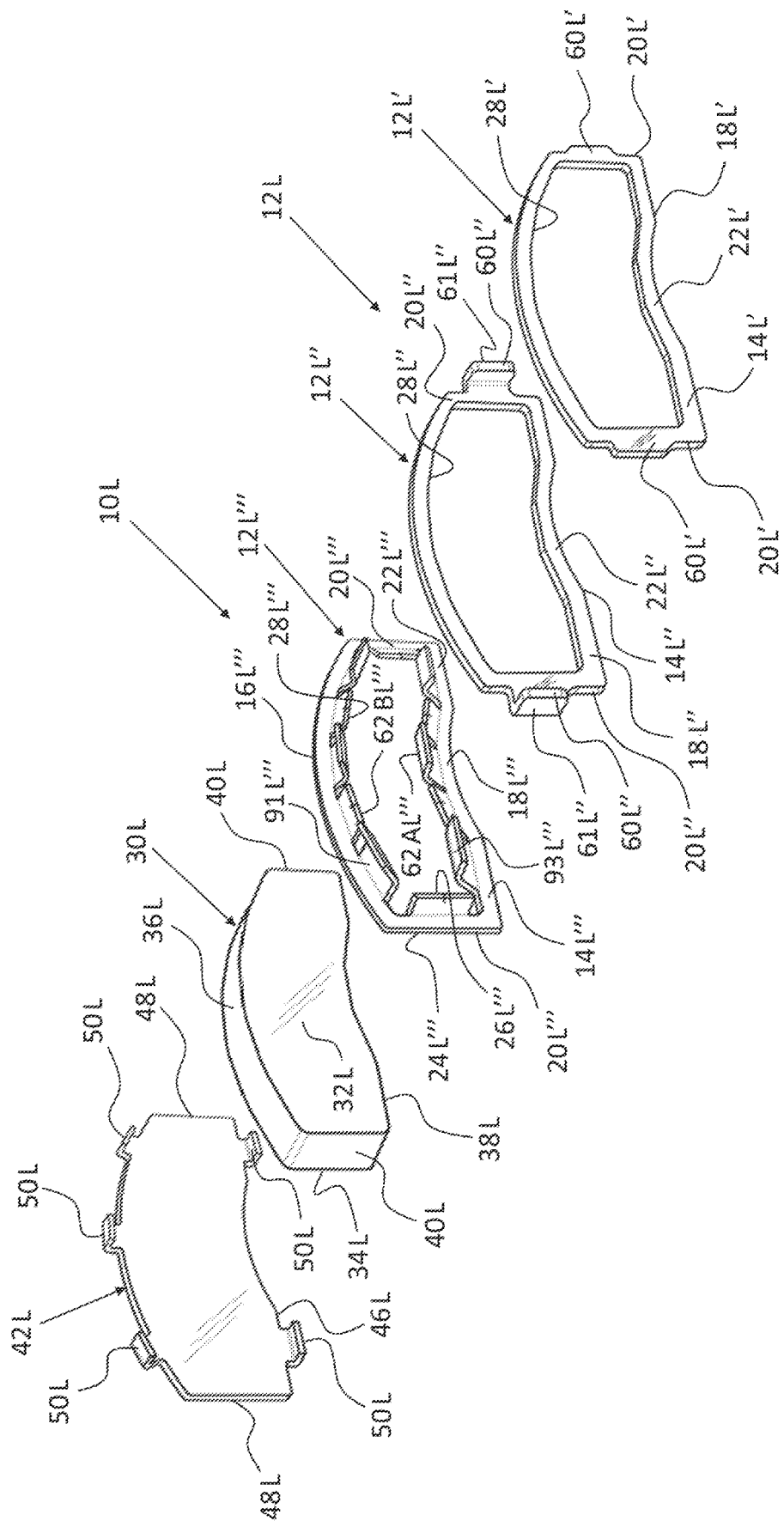
FIG. 12A is a perspective, exploded view of a ninth embodiment of a friction capturing and positioning assembly.
Figure 12B:
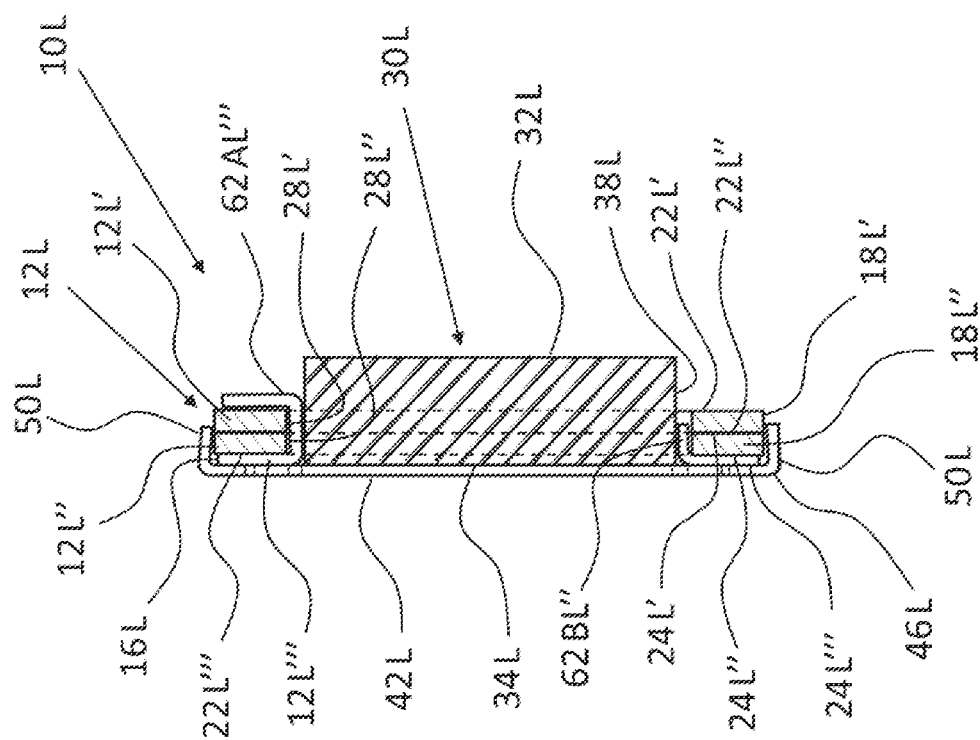
FIG. 12B is a side, cross-sectional view of the ninth embodiment of a friction capturing and positioning assembly.

With reference to FIGS. 12A-12B, a ninth embodiment of the friction element capturing and positioning assembly 10L is shown. According to this embodiment, the positioning frame 12L is comprised of a first base frame 12L' overlying a second base frame 12L" and a capturing insert 12L''', with the second base frame 12L" overlying the capturing insert 12L'''. A first capturing slot 28L' is defined by the first base frame 12L', a second capturing slot 28L" is defined by the second base frame 12L", and a third capturing slot 28L''' is defined by the capturing insert 12L"

A plurality of frame tabs 62AL''', 62BL''' extend from the capturing insert 12L''', which are each received by the first and second capturing slots 28L', 28L" of the first and second base frames 12L', 12L" and configured to engage the friction puck 30L and hold the friction puck 30L and first and second base frames 12L', 12L" in place.

More particularly, the plurality of frame tabs 62AL", 62BL" includes a plurality of jointed frame tabs 62AL''' and a plurality of unjointed frame tabs 62BL'''. According to this embodiment, the jointed and unjointed frame tabs 62AL", 62BL" are alternately located about the circumference of the capturing slot 28L", but could be arranged in other manners based on specific needs.

During assembly, the unjointed frame tabs 62BL''' are inserted into the first and second capturing slots 28L', 28L", and are then forcibly displaced as the friction puck 30L is pressed into position within the capturing slots 28L', 28L", 28L'''. As shown in FIG. 12B, after assembly the unjointed frame tabs 62BL" primarily serve to capture the friction puck 30N. On the.

Similarly, during assembly, the jointed frame tabs 62AL''' are inserted into the first and second capturing slots 28L', 28L", and are then forcibly displaced as the friction puck 30L is pressed into position within the capturing slots 28L', 28L", 28L'''. As shown in FIG. 12B, after assembly the jointed frame tabs 62AL" wrap about the base frames 12L', 12L" such that they primarily serve to hold the base frames 12L', 12L" in place. The jointed frame tabs 62AL''' each have a first component 91L''' that overlies the friction puck 30L and a second component 93L''' that extends from the first component 91L''' and linearly over the front face 22N' of the first base component 12N'. The rear surface 24L''' of the capturing insert 12L''' of the positioning frame 12L and the rear face 34L of the friction puck 30L both overlie and engage a shim plate 42L. A plurality of clips 50L extend from the top edge 44L and bottom edge 46L of the shim plate 42L generally perpendicularly to the face of the shim plate 42L. The clips 42L overlie the positioning frame 12L to align the shim plate 42L relative to the positioning frame 12L. Additionally, the top, bottom and side faces of friction puck 30L and faces of capturing slots 28L', 28L" may be perpendicular to the face of positioning frames 12L' and 12L" or tapered inward or outward to any suitable degree to provide wedging of the friction puck 30L in the friction frame surfaces 26L. Additionally, the friction puck 30L may be fitted within the frame friction surfaces 26L via an interference fit.

Furthermore, the location tabs 60L" of the second base frame 12L" also define bearing surfaces 61L" that serve to reduce friction between the brake pad assembly 10L and sliding tracks of the brake caliper during brake actuation.

Figure 13A:
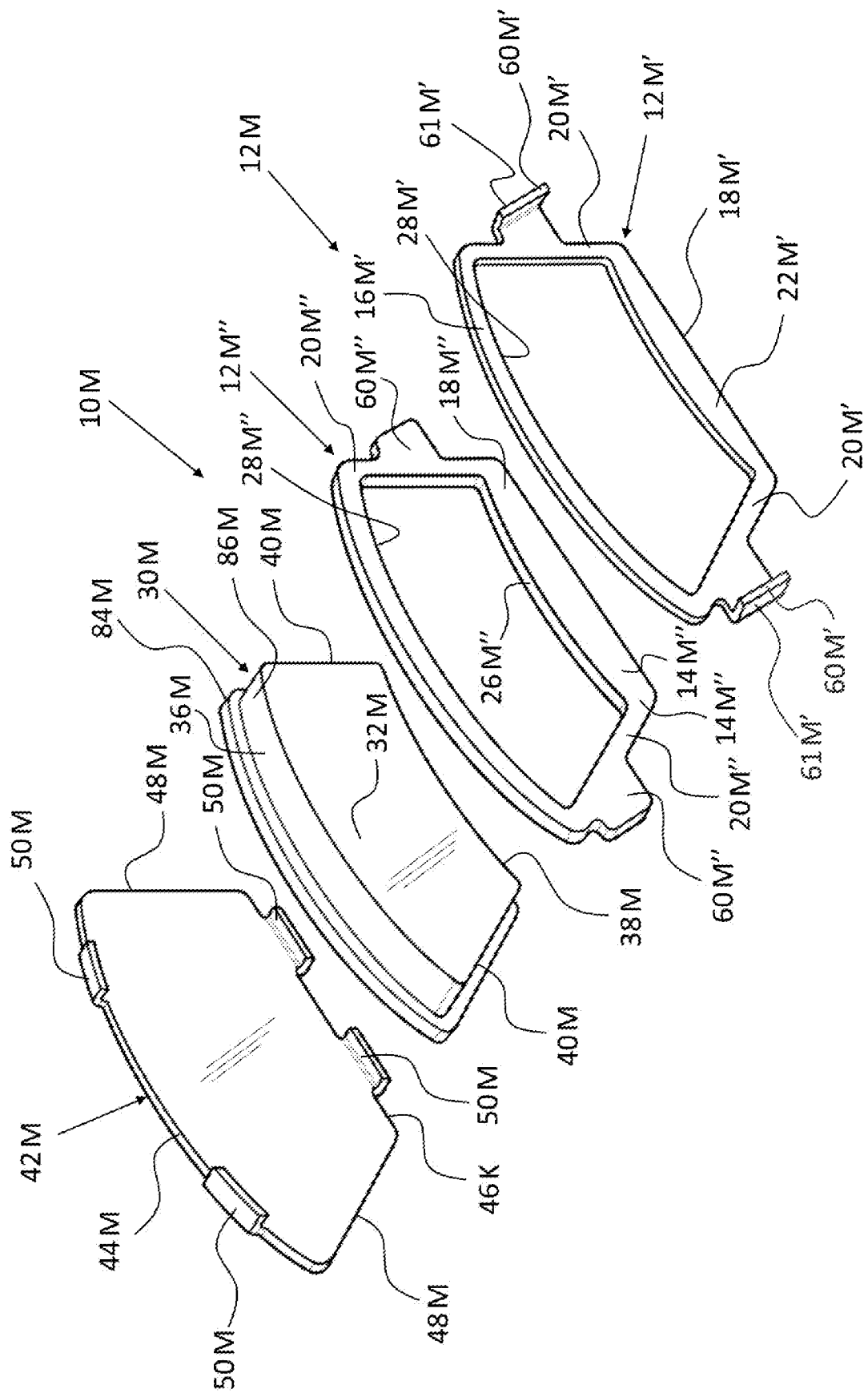
FIG. 13A is a perspective, exploded view of a tenth embodiment of a friction capturing and positioning assembly.
Figure 13B:
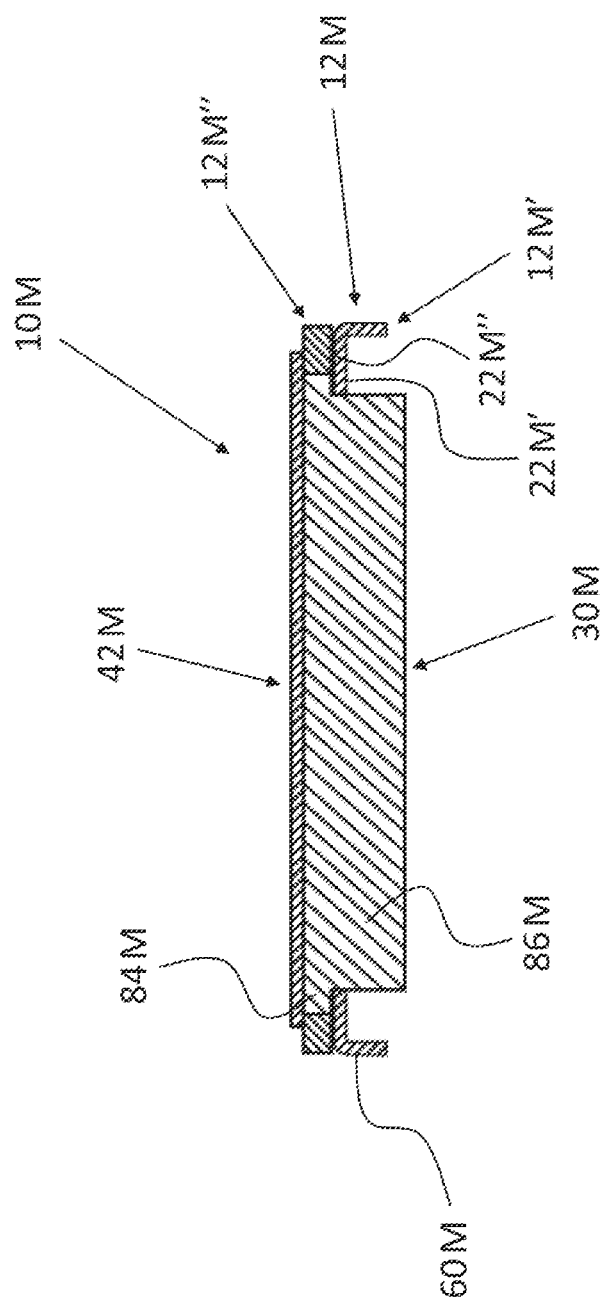
FIG. 13B is a side, cross-sectional view of the tenth embodiment of a friction capturing and positioning assembly.

FIGS. 13A-13B present a tenth embodiment of the friction element capturing and positioning assembly 10M. According to this embodiment, the positioning frame 12M is comprised of a first base frame 12M' and a second base frame 12M", with the first base frame 12M' overlying the second base frame 12M". Furthermore, the first base frame 12M' defines a first capturing slot 28M', and the second base frame 12M" defines a second capturing slot 28M". According to this arrangement, the first and second capturing slots 28M', 28M" receive the friction puck 30M. With reference to FIG. 13B, the friction puck 30M defines a wide portion 84M and a narrow portion 86M such that the friction puck 30M is tiered. The second positioning frame 12M" is located about the and the first positioning frame 12M' is located about the narrow portion 86M. Furthermore, the first positioning frame 12M' has location tabs 60M' and the second positioning frame 12M" has attachment flats 60M" which are aligned with the location tabs 60M'. As in the embodiment of FIGS. 12A-12B, the lighter gauge material from which base frames 12M', 12M" can be produced reduces the tonnage requirement of the manufacturing equipment needed to stamp the base frames 12M', 12M", compared to a thicker frame section such as in the embodiments of FIGS. 1A-1B, 2, 4, 5 and 8A-8B. Additionally, the top, bottom and side faces of friction puck 30M, including wide portion 84M, and faces of capturing slots 28M', 28M" may be perpendicular to the face of positioning frames 12M' and 12M" or tapered inward or outward to any suitable degree.

The rear surface 24M" of the second positioning frame 12M" of the positioning frame 12M and the rear face 34M of the friction puck 30M both overlie and engage a shim plate 42M. A plurality of clips 50M extend from the top edge 44M and bottom edge 46M of the shim plate 42M generally perpendicularly to the face of the shim plate 42M. The clips 42M overlie the positioning frame 12M to align the shim plate 42M relative to the positioning frame 12M.

Furthermore, the location tabs 60M' of the positioning frame 12M' also define bearing surfaces 61M' that serve to reduce friction between the brake pad assembly 10M and sliding tracks of the brake caliper during brake actuation.

Figure 14A:
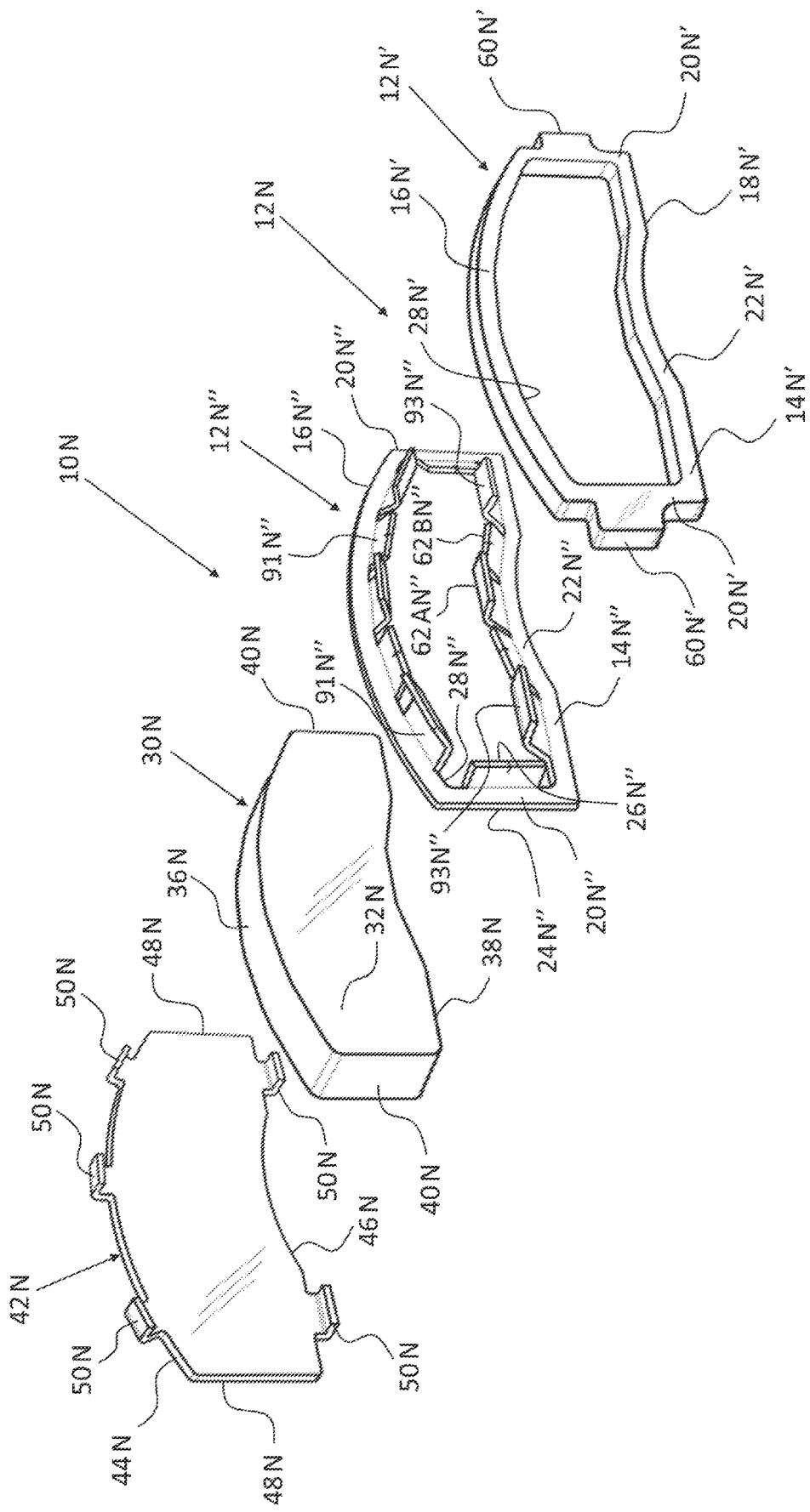
FIG. 14A is a perspective, exploded view of an eleventh embodiment of a friction capturing and positioning assembly.
Figure 14B:
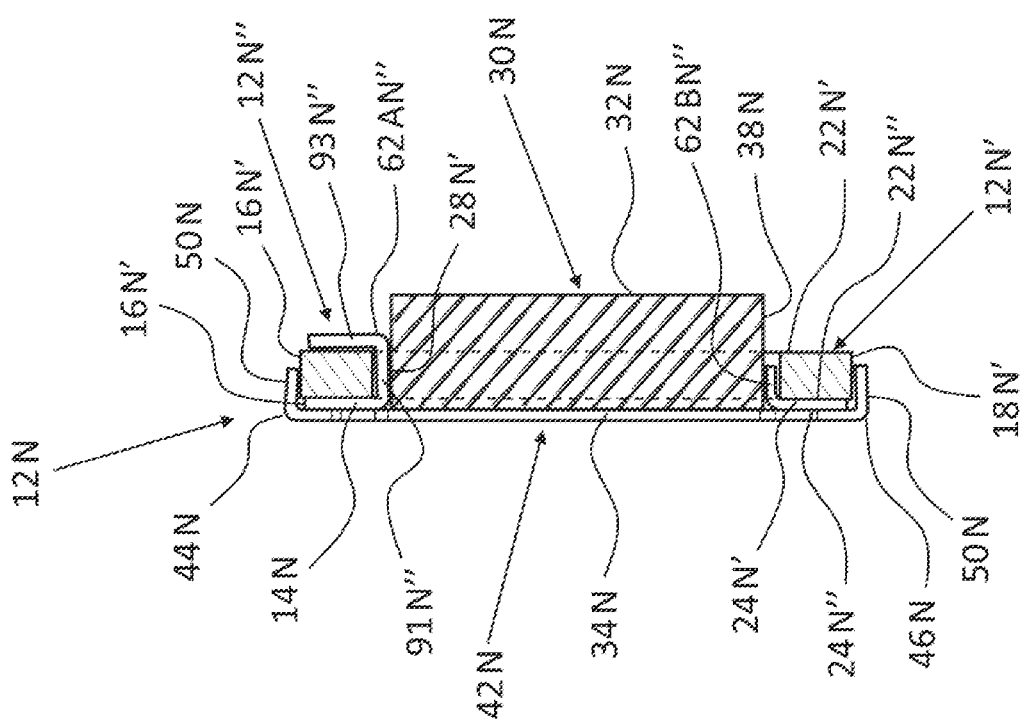
FIG. 14B is a side, cross-sectional view of the eleventh embodiment of a friction capturing and positioning assembly.

FIGS. 14A-14B present an eleventh embodiment of the friction element capturing and positioning assembly 10N. This arrangement is similar to the embodiment of FIGS. 12A-12B, but includes only a single base frame 12N'. More particularly, according to this embodiment, the positioning frame 12N is comprised of a base frame 12N' overlying a capturing insert 12N". A first capturing slot 28N' is defined by the base frame 12N', a second capturing slot 28N" is defined by the capturing insert 12N". A plurality of frame tabs 62AN", 62BN" extend from the capturing insert 12N", which are each received by the first capturing slot 28N' of the base frame 12N' and configured to engage the friction puck 30N and hold the friction puck 30N and base frame 12N' in place in a similar manner as described in relation to the embodiment of FIGS. 8A-8B. The frame tabs 62AN", 62BN" are each biased toward the friction puck 30N for securing the friction puck 30N and positioning frame 12N components in place. As shown, the frame tabs 62AN", 62BN" are located along top, bottom, and side edges of the capturing slot 28N" to provide an even biasing force around the friction pick 30N.

More particularly, the frame tabs 62AN", 62BN" include a plurality of jointed frame tabs 62AN" and a plurality of unjointed frame tabs 62BN". According to this embodiment, the jointed and unjointed frame tabs 62AN", 62BN" are alternately located about the circumference of the capturing slot 28N", but could be arranged in other manners based on specific needs.

During assembly, the unjointed frame tabs 62BN" are inserted into the first capturing slot 28N', and are then forcibly displaced as the friction puck 30N is pressed into position within the first capturing slot 28N'. As shown in FIG. 14B, after assembly the unjointed frame tabs 62BN" primarily serve to capture the friction puck 30N.

Similarly, during assembly, the jointed frame tabs 62AN" are inserted into the first capturing slots 28N', and are then forcibly displaced as the friction puck 30N is pressed into position within the capturing slot 28N'. As shown in FIG. 14B, after assembly the jointed frame tabs 62AN" wrap about the base frame 12N' such that they primarily serve to hold the base frame 12N' in place. The jointed frame tabs 62AN" each have a first component 91N" that overlies the friction puck 30N and a second component 93N" that extends from the first component 91N" and linearly over the front face 22N' of the base component 12N'.

The rear surface 24N" of the capturing insert 12N" of the positioning frame 12N and the rear face 34N of the friction puck 30N both overlie and engage a shim plate 42N. A plurality of clips 50N extend from the top edge 44N and bottom edge 46N of the shim plate 42N generally perpendicularly to the face of the shim plate 42N. The clips 42N overlie the capturing insert 12N" and base portion 12N' of the positioning frame 12N to align the shim plate 42N relative to the positioning frame 12N.

It should be appreciated that the components of the positioning frame 12N in this embodiment and the others discussed herein may be made via extruded or pultruded materials to provide a simplified manufacturing process.

Furthermore, the top, bottom and side faces of friction puck 30N and faces of capturing slot 28N, may be perpendicular to the face of positioning frame 12N' or tapered inward or outward to any suitable degree.

Figure 15A:
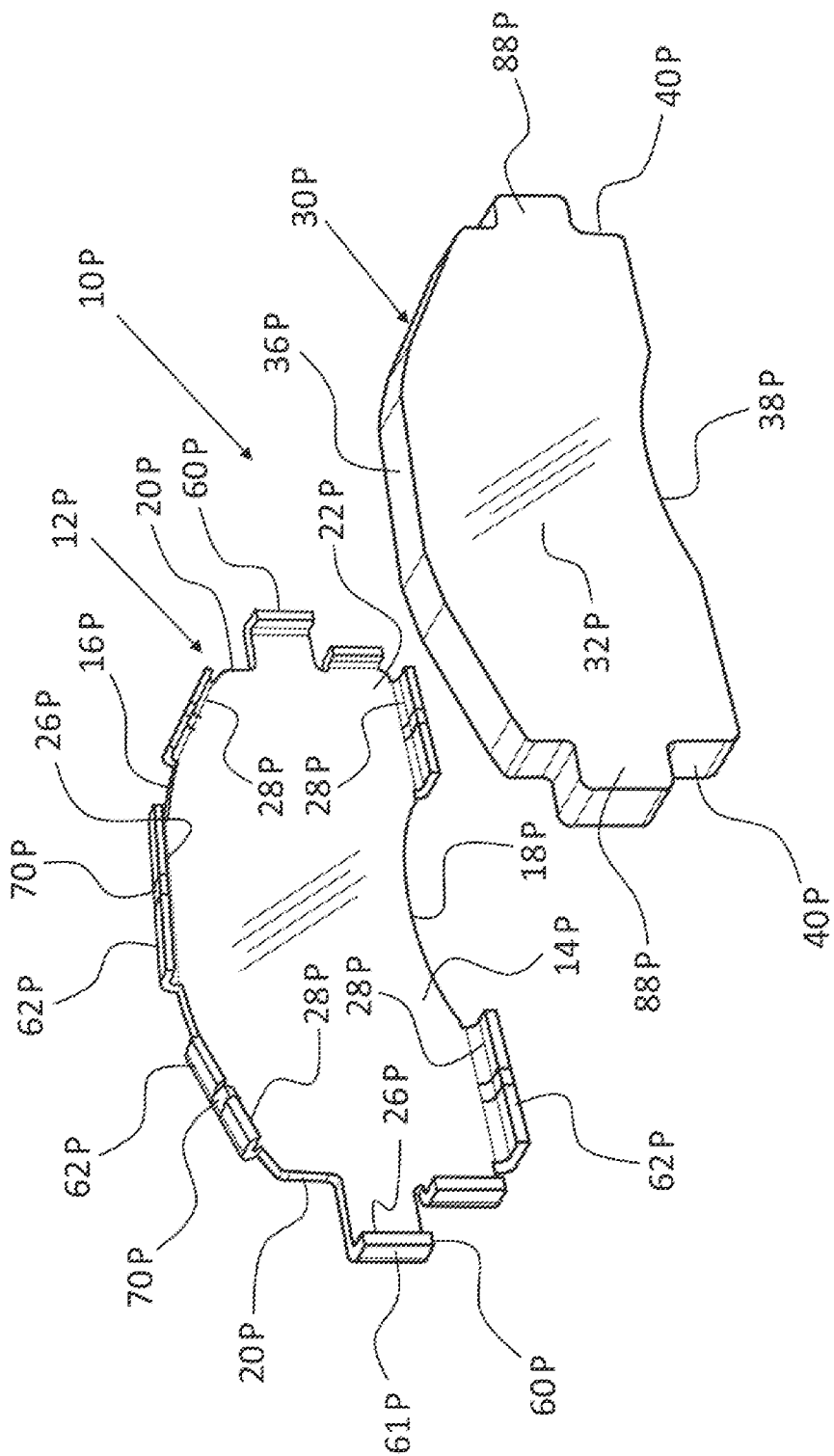
FIG. 15A is a perspective, exploded view of a twelfth embodiment of a friction capturing and positioning assembly.
Figure 15B:
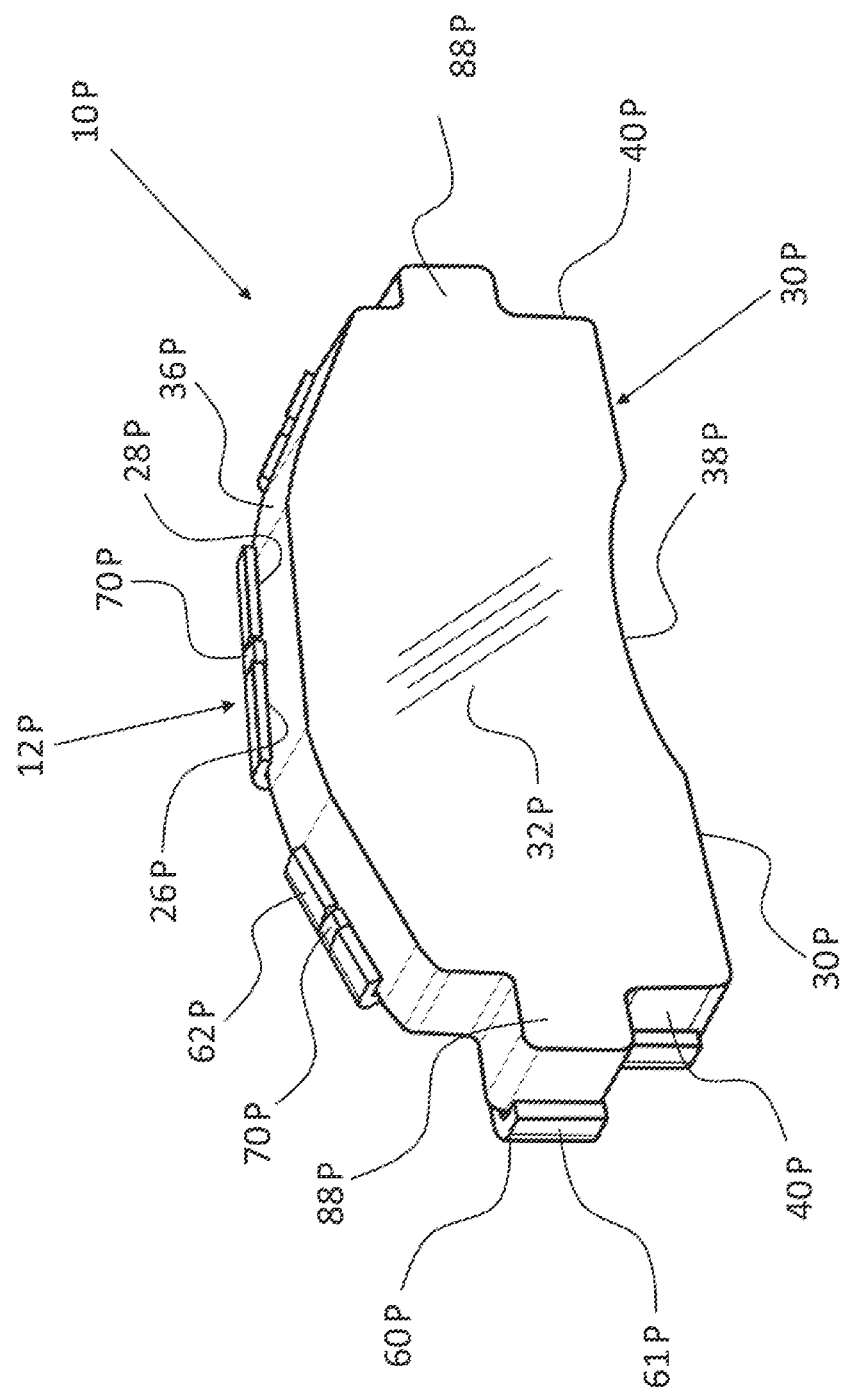
FIG. 15B is a perspective view of the twelfth embodiment of a friction capturing and positioning assembly.

FIGS. 15A-15B present a twelfth embodiment of the friction element capturing and positioning assembly 10P. According to this embodiment, the base portion 14P of the positioning frame 12P is planar and extends continuously between a pair of side segments 20P of the base portion 14P without defining a capturing slot or other openings through the base portion 14P. Instead, a plurality of frame tabs 62P project from the base portion 14P and define a plurality of frame friction surfaces 26P (capturing surfaces of the friction puck 30P) to define the capturing slot 28P. In other words, the capturing slot 28P takes the form of a pocket between the various frame tabs 62P. As further shown, the location tabs 60P each define one of the frame friction surfaces 26P, both functioning as a location tab 60P and bearing surface 61P that serves to reduce friction between the brake pad assembly 10P and sliding tracks of the brake caliper within which the integral caliper tab portions 88P migrate during brake actuation. Frame tabs 62P are located along the top segment 16P, the bottom segment 18P and the side segments 20P. A plurality of fitment tabs 70P may extend angularly inwardly from the base portion 14P along each of the frame tabs 62P into the capturing slot 28P to engage the friction puck 30P to accommodate minor friction puck 30P dimensional variations. According to this arrangement, the friction puck 30P includes integral caliper tab portions 88P extending from the friction puck 30P side portions 40P and operational friction face 32P. In assembly, the positioning frame 12P is fit to the friction puck 30P and is connected via frame tabs 62P and fitment tabs 70P. Bonding, riveting, or integral bonding techniques may be utilized to further secure the friction puck 30P to the positioning frame 12P, but are not needed according to a preferred embodiment. It should be appreciated that the location tabs 60P and caliper tab portions 88P (for this and other embodiments) provide proper fitment, alignment and movement of the friction puck 30P within existing caliper designs. Furthermore, the top, bottom and side faces of friction puck 30P and faces of capturing slot 28P, may be perpendicular to the face of positioning frame 12P' or tapered inward or outward to any suitable degree.

Figure 16:
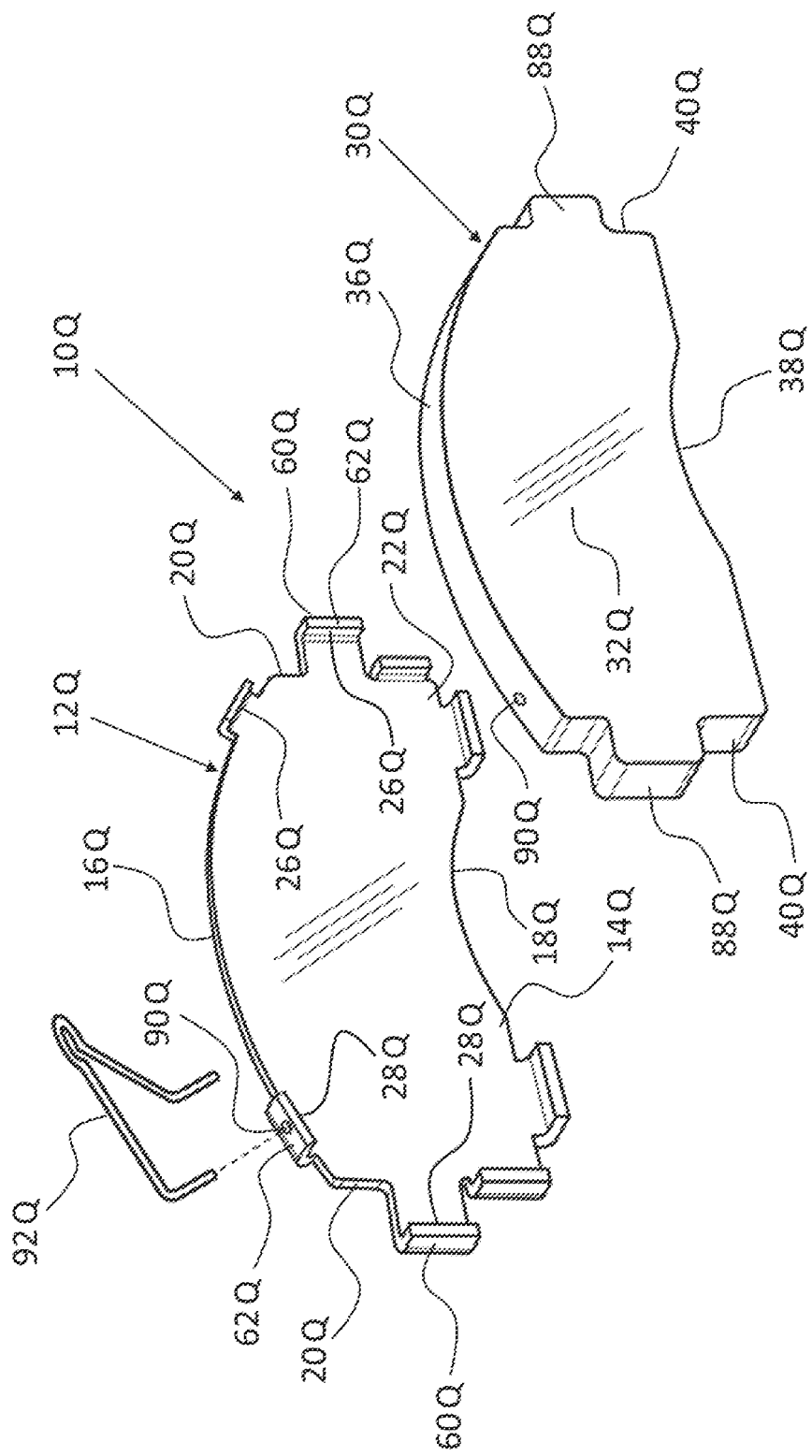
FIG. 16 is a perspective, exploded view of a thirteenth embodiment of a friction capturing and positioning assembly.

FIG. 16 presents a thirteenth embodiment of the friction element capturing and positioning assembly 10Q. This embodiment is similar to that of FIGS. 15A-15B, but includes fewer frame tabs 62Q, and a number of the frame tabs 62Q as well as the friction puck 30Q defines hardware receiving recesses 90Q for positioning hardware such as springs 92Q that serve to return the friction puck 30Q to a neutral position apart from the brake rotor disc when the brakes are not activated so as to fully engage the friction puck 30Q in order to reduce unwanted drag and wear. Additionally, the top, bottom and side faces of friction puck 30Q and faces of capturing slot 28Q, may be perpendicular to the face of positioning frame 12Q' or tapered inward or outward to any suitable degree to provide wedging of the friction puck 30Q in the friction frame surfaces 26Q. Additionally, the friction puck 30Q may be fitted within the frame friction surfaces 26Q via an interference fit.

Figure 17:
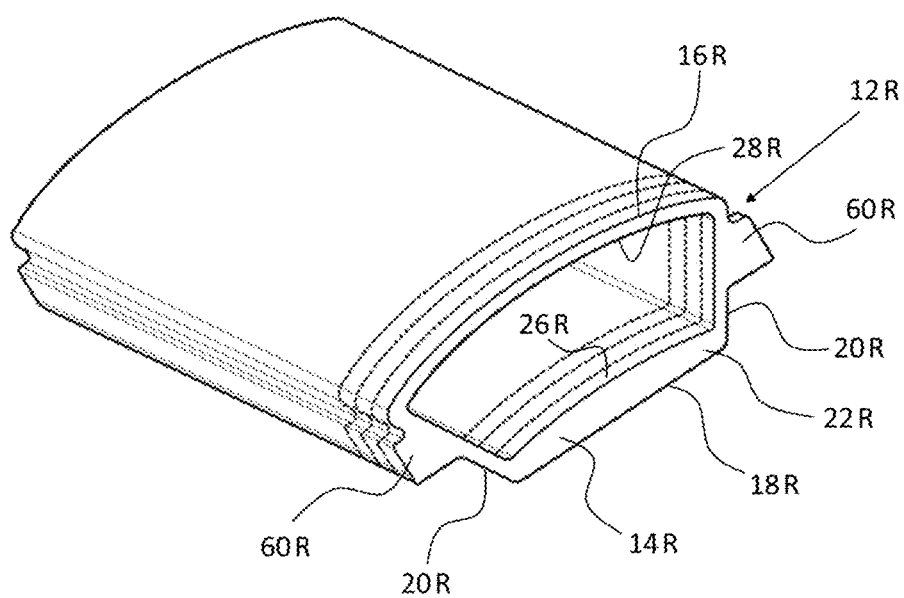
FIG. 17 is a perspective view illustrating a method of making an embodiment of a positioning frame of the friction capturing and positioning assembly.

FIG. 17 presents a manner of constructing positioning frames 12R. More particularly, FIG. 17 illustrates an extrusion or pultruded material section from which positioning frames can be individually segmented through various cutting/shearing techniques.

Figure 18A:
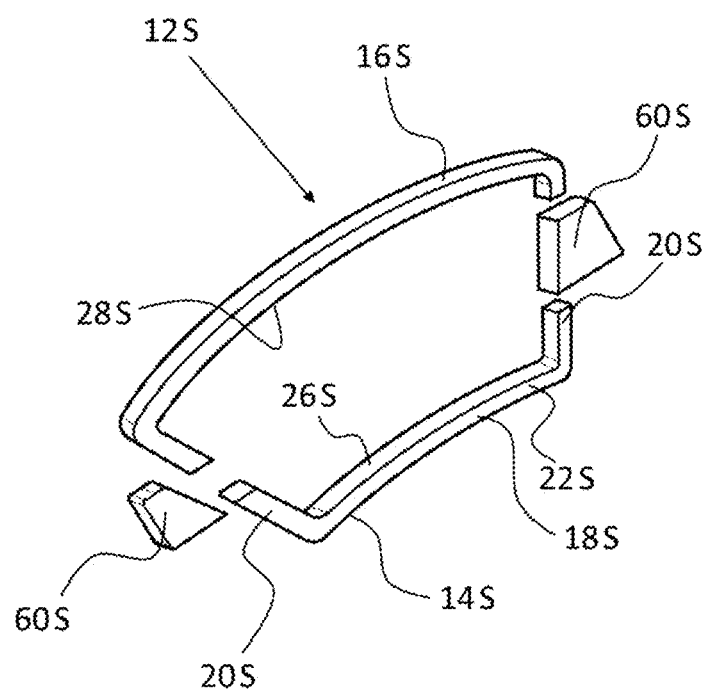
FIG. 18A is a perspective view illustrating an embodiment of a positioning frame being assembled from multiple pieces.

FIG. 18A presents another manner of constructing positioning frames 12S in which any number of segments of the positioning frame 12S may be fixed and joined together by any suitable means including solid state plasma or other welding techniques.

Figure 18B:
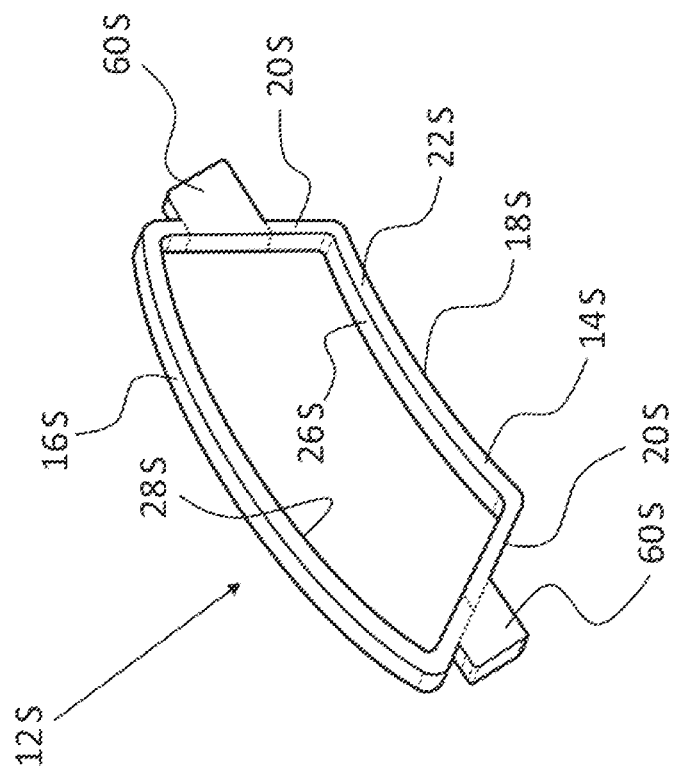
FIG. 18B is a perspective view illustrating the embodiment of a positioning frame of FIG. 18A being assembled from multiple pieces.

FIG. 18B presents the embodiment of FIG. 18A when the exemplary segments are joined together.

In accordance with the above-described embodiments, the connection of the friction puck to the positioning frame via the capturing slot and frame friction surfaces provides a simple and low cost manner of connecting the friction puck to the positioning frame which eliminates the need for heavier and more costly back plates, complicated secondary processing used to produce texture upon the back plate surface as required for integral molding, and eliminates the need for bonding, riveting, or other methods of affixing the friction element to a back plate. Of note, the assembly advantageously uses few components, e.g., a positioning frame and friction puck alone, without the use of a traditional back plate. Furthermore, testing has shown that the assembly is able to directly withstand forces generated by hydraulic pistons within a brake caliper pressing the puck against the rotor face during braking, which in turn introduces additional highly dynamic forces and heat to the friction puck. This aspect is supplemented by the use of the composite material and material/pultrusion method of Applicant's U.S. Pat. No. 11,007,684 (discussed above), used with any of the discussed embodiments.

It will be understood that implementations of a friction element capturing and positioning assembly include but are not limited to the specific components disclosed herein, as virtually any components consistent with the intended operation of various friction element capturing and positioning assemblies may be utilized. Accordingly, for example, it should be understood that while the drawings and accompanying text show and describe particular friction element capturing and positioning assembly implementations, any such implementation may comprise any shape, size, style, type, model, version, class, grade, measurement, concentration, material, weight, quantity, and/or the like consistent with the intended operation of a friction element capturing and positioning assembly.

The concepts disclosed herein are not limited to the specific friction element capturing and positioning assembly implementations shown herein. For example, it is specifically contemplated that the components included in particular friction element capturing and positioning assemblies of the present disclosure may be formed of any of many different types of materials or combinations that can readily be formed into shaped objects and that are consistent with the intended operation of the friction element capturing and positioning assembly. For example and without limitation, the components may be formed of: rubbers (synthetic and/or natural) and/or other like materials; glasses (such as fiberglass), carbon-fiber, aramid-fiber, ceramic fiber, any combination thereof, and/or other like materials; polymers such as thermoplastics (such as ABS, Fluoropolymers, Polyacetal, Polyamide, Polycarbonate, Polyethylene, Polysulfone, and/or the like), thermosets (such as Epoxy, Phenolic, Polyimide, Polyurethane, Silicone, and/or the like), any combination thereof, and/or other like materials; composites and/or other like materials; metals (such as zinc, magnesium, titanium, copper, iron, steel, carbon steel, alloy steel, tool steel, stainless steel, spring steel, aluminum, any combination thereof), and/or other like materials; alloys (such as aluminum alloy, titanium alloy, magnesium alloy, copper alloy, any combination thereof), and/or other like materials; any other suitable material; and/or any combination of the foregoing.

Furthermore, friction element capturing and positioning assembly implementations of the present disclosure may be manufactured separately and then assembled together, or any or all of the components may be manufactured simultaneously and integrally joined with one another. Manufacture of these components separately or simultaneously, as understood by those of ordinary skill in the art, may involve extrusion, pultrusion, compression molding, injection molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a plastic weld, a fastener, any combination thereof, and/or the like for example, depending on, among other considerations, the particular material(s) forming the components.

In places where the description above refers to particular friction element capturing and positioning assembly embodiments, it should be readily apparent that a number of modifications may be made without departing from the spirit thereof and that these implementations may be applied to other implementations disclosed or undisclosed. The presently disclosed friction element capturing and positioning assembly implementations are, therefore, to be considered in all respects as illustrative and not restrictive.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:
1. A friction element capturing and positioning assembly, comprising:
a positioning frame including a base portion having a periphery and defining a plurality of frame friction surfaces defining at least one capturing slot extending through the base portion; and at least one friction puck received by the at least one capturing slot and fixed to the positioning frame at the frame friction surfaces;

wherein the positioning frame comprises a base frame and a capturing insert, with the base frame overlying the capturing insert, wherein the at least one capturing slot includes a first capturing slot defined by the base frame and a second capturing slot defined by the capturing insert with the first and second capturing slots overlying one another.

2. The friction element capturing and positioning assembly as set forth in claim 1, wherein the friction puck has a front face, a rear face, a top face, a bottom face, and a pair of side faces, and wherein the top, bottom and side faces of the friction puck are tapered along a length of the friction puck between the front and rear faces such that the friction puck is wedged in the capturing slot.

3. The friction element capturing and positioning assembly as set forth in claim 1, wherein the positioning frame includes at least one frame tab projecting from the base portion and defining at least one of the frame friction surfaces, and at least partially defining the capturing slot.

4. The friction element capturing and positioning assembly as set forth in claim 3, wherein the at least one frame tab is comprised of a plurality of frame tabs positioned in spaced relationship with one another.

5. The friction element capturing and positioning assembly as set forth in claim 3 further including at least one fitment tab extending from the base portion at an angle that is different than an angle from which the at least one frame tab extends for engaging the friction puck.

6. The friction element capturing and positioning assembly as set forth in claim 3, wherein the at least one frame tab defines at least one spring receiving recess, and wherein a friction spring is received in the at least one spring receiving recess for extending between the frame tab and the friction puck for holding the friction puck in place.

7. The friction element capturing and positioning assembly as set forth in claim 3, wherein the capturing slot extends through the base portion of the positioning frame, wherein the at least one frame tab extends around at least substantially an entire perimeter of the capturing slot, wherein the friction puck has a front face, a rear face, top face, a bottom face, and a pair of side faces, wherein the top, bottom and side faces of the friction puck taper along a length between the front and rear faces, and wherein the at least one frame tab extends in position substantially equal to that of the friction puck such that the frame tab overlies the side faces of the friction puck flush with the side faces of the friction puck.

8. The friction element capturing and positioning assembly as set forth in claim 7, wherein the frame tab defines a plurality of orifices for receiving tightening fasteners for engaging the friction puck.

9. The friction element capturing and positioning assembly as set forth in claim 1, further including a shim plate, wherein the friction puck and positioning frame overlie the shim plate.

10. The friction element capturing and positioning assembly as set forth in claim 9, wherein the shim plate has a top edge, a bottom edge and a pair of side edges, and wherein at least one clip extends transversely from the top edge and overlies the positioning frame and the friction puck.

11. The friction element capturing and positioning assembly as set forth in claim 1, wherein the friction puck has a top face and a bottom face, wherein the top face and the bottom face of the friction puck each define at least one alignment recess, wherein the positioning frame has a top segment and a bottom segment, and wherein at least at least one alignment finger extends from the top segment of the positioning frame and at least one alignment finger extends from the bottom segment of the positioning frame, and wherein each of the alignment fingers are received by one of the alignment recesses of the friction puck for aligning the friction puck relative to the positioning frame.

12. The friction element capturing and positioning assembly as set forth in claim 1, wherein each frame friction surface includes texturing about the capturing slot for frictionally engaging the friction puck upon insertion of the friction puck into the capturing slot.

13. The friction element capturing and positioning assembly as set forth in claim 1, wherein the positioning frame defines a recessed portion being recessed relative to the base portion, wherein a sidewall extends between the base portion and the recessed portion, wherein the capturing slot extends through the base portion in the recessed portion, and wherein the friction puck is connected to the recessed portion and the sidewall.

14. The friction element capturing and positioning assembly as set forth in claim 1, wherein the at least one capturing slot includes a pair of capturing slots in spaced relationship with one another, and wherein the at least one friction puck includes a pair of friction pucks each received by one of the capturing slots.

15. The friction element capturing and positioning assembly as set forth in claim 1, wherein a plurality of frame tabs extend from the capturing insert, each received by the first capturing slot of the base frame and configured to engage the friction puck and base frame.

16. The friction element capturing and positioning assembly as set forth in claim 15, wherein the plurality of frame tabs includes a plurality unjointed frame tabs extending linearly over the friction puck, and a plurality of jointed frame tabs including a first component extending linearly over the friction puck and a second component extending from the first component linearly over a front surface of the base frame.

17. The friction element capturing and positioning assembly as set forth in claim 1, further including a shim plate, wherein the friction puck and positioning frame overlie the shim plate.

18. The friction element capturing and positioning assembly as set forth in claim 17, wherein the shim plate has a top edge, a bottom edge and a pair of side edges, and wherein at least one clip extends transversely from the top edge and overlies the positioning frame and the friction puck.

19. The friction element capturing and positioning assembly as set forth in claim 18, wherein the at least one clip includes a plurality of clips with at least one of the plurality of clips extending transversely from the bottom edge and underlying the positioning frame and the friction puck.

20. The friction element capturing and positioning assembly as set forth in claim 1, wherein a plurality of fitment tabs each extend from the base frame into one of the capturing slots at an angle that is different than an angle from which the frame tabs extend.

21. The friction element capturing and positioning assembly as set forth in claim 1, wherein the positioning frame is comprised of the first base frame overlying a second base frame and a capturing insert, with the second base frame overlying the capturing insert, wherein the at least one capturing slot includes the first capturing slot defined by the first base frame, the second capturing slot defined by the second base frame, and a third capturing slot defined by the capturing insert, and wherein a plurality of frame tabs extend from the capturing insert, each received by the first and second capturing slots of the first and second base frames and configured to engage the friction puck.

22. The friction element capturing and positioning assembly as set forth in claim 1, wherein the positioning frame is comprised of the first base frame and a second base frame, with the first base frame overlying the second base frame, and wherein the at least one capturing slot includes the first capturing slot defined by the first base frame and the second capturing slot defined by the second base frame, and wherein the first and second capturing slots receive the friction puck.

23. A friction element capturing and positioning assembly, comprising:
a shim plate comprising a face and a plurality of clips extending from at least a top edge and a bottom edge of the shim plate generally perpendicular to the face of the shim plate;
a positioning frame including a base portion having a front surface and a rear surface and defining a plurality of frame friction surfaces defining a positioning frame capturing slot with a plurality of frame tabs located about a circumference of the positioning frame capturing slot and extending forward of the front surface of the positioning frame, the plurality of frame tabs including a plurality of jointed frame tabs and a plurality of unjointed frame tabs, the positioning frame adjacent to the shim plate;
at least one friction puck received by the positioning frame capturing slot and interference fit into the positioning frame and fixed therein by the frame friction surfaces; and
at least one base frame comprising a front surface and a rear surface and at least one base frame capturing slot extending therethrough and surrounding the at least one friction puck, the plurality of frame tabs extending through the at least one base frame capturing slot between the at least one base frame and the at least one friction puck, wherein the jointed frame tabs further overlay the front surface of the at least one base frame to capture the at least one base frame between a portion of the jointed frame tabs and the front surface of the positioning frame.

24. The friction element capturing and positioning assembly as set forth in claim 23, wherein the friction puck has a front face, a rear face, a top face, a bottom face, and a pair of side faces, and wherein the top, bottom and side faces of the friction puck are tapered along a length of the friction puck between the front and rear faces such that the friction puck is wedged in the positioning frame capturing slot.

25. The friction element capturing and positioning assembly as set forth in claim 23, wherein the at least one base frame comprises a first base frame comprising a first base frame capturing slot and a second base frame comprising a second base frame capturing slot, wherein at least one friction puck extending through both the first base frame capturing slot and the second base frame capturing slot, the plurality of frame tabs extending through the first base frame capturing slot and the second base frame capturing slot between the first and second base frame capturing slots and the at least one friction puck, the first base frame being positioned forward of the second base frame such that when the jointed frame tabs overlay the front surface of the first base frame, the first base frame and the second base frame are captured between the portion of the jointed frame tabs and the front surface of the positioning frame.

26. A friction element capturing and positioning assembly, comprising:
a positioning frame including a base portion having a front surface and a rear surface and defining a plurality of frame friction surfaces defining a positioning frame capturing slot with a plurality of frame tabs extending forward of the front surface of the positioning frame;
at least one friction puck received by the positioning frame capturing slot and fixed therein by the frame friction surfaces; and
at least one base frame comprising a front surface and a rear surface and at least one base frame capturing slot extending therethrough and surrounding the at least one friction puck, the plurality of frame tabs extending through the at least one base frame capturing slot between the at least one base frame and the at least one friction puck, wherein jointed frame tabs further overlay the front surface of the at least one base frame to capture the at least one base frame between a portion of the jointed frame tabs and the front surface of the positioning frame.

27. The friction element capturing and positioning assembly as set forth in claim 26, wherein the friction puck has a front face, a rear face, a top face, a bottom face, and a pair of side faces, and wherein the top, bottom and side faces of the friction puck are tapered along a length of the friction puck between the front and rear faces such that the friction puck is wedged in the positioning frame capturing slot.

28. The friction element capturing and positioning assembly as set forth in claim 26, wherein the at least one base frame comprises a first base frame comprising a first base frame capturing slot and a second base frame comprising a second base frame capturing slot, wherein at least one friction puck extending through both the first base frame capturing slot and the second base frame capturing slot, the plurality of frame tabs extending through the first base frame capturing slot and the second base frame capturing slot between the first and second base frame capturing slots and the at least one friction puck, the first base frame being positioned forward of the second base frame such that when the jointed frame tabs overlay the front surface of the first base frame, the first base frame and the second base frame are captured between the portion of the jointed frame tabs and the front surface of the positioning frame.

29. The friction element capturing and positioning assembly as set forth in claim 26, further comprising a shim plate comprising a face and a plurality of clips extending from at least a top edge and a bottom edge of the shim plate generally perpendicular to the face of the shim plate.

* * * * *